(12) United States Patent
Gage et al.

(10) Patent No.: US 9,048,969 B2
(45) Date of Patent: Jun. 2, 2015

(54) MOBILE STATION-ASSISTED INTERFERENCE MITIGATION

(75) Inventors: William Anthony Gage, Stittsville (CA); Robert Novak, Stittsville (CA)

(73) Assignee: BlackBerry Limited, Waterloo, Ontario (CA)

(*) Notice: Subject to any disclaimer, the term of this patent is extended or adjusted under 35 U.S.C. 154(b) by 168 days.

(21) Appl. No.: 13/611,437

(22) Filed: Sep. 12, 2012

(65) Prior Publication Data

US 2013/0003589 A1 Jan. 3, 2013

Related U.S. Application Data

(63) Continuation of application No. PCT/CA2011/050286, filed on May 10, 2011.

(51) Int. Cl.
*H04W 72/04* (2009.01)
*H04J 11/00* (2006.01)
*H04W 72/00* (2009.01)
*H04L 5/00* (2006.01)

(52) U.S. Cl.
CPC ............ *H04J 11/0023* (2013.01); *H04W 72/00* (2013.01); *H04W 72/04* (2013.01); *H04L 5/0073* (2013.01)

(58) Field of Classification Search
None
See application file for complete search history.

(56) References Cited

U.S. PATENT DOCUMENTS

| | | | |
|---|---|---|---|
| 6,892,054 B2 | 5/2005 | Belcher et al. | |
| 7,509,096 B2 | 3/2009 | Palm et al. | |
| 8,660,497 B1 | 2/2014 | Zhang et al. | |
| 2004/0157613 A1 | 8/2004 | Steer et al. | |
| 2008/0225814 A1 | 9/2008 | Thermond et al. | |
| 2009/0196174 A1* | 8/2009 | Ji | 370/230.1 |
| 2009/0197588 A1 | 8/2009 | Khandekar et al. | |
| 2009/0231989 A1 | 9/2009 | Larsson et al. | |
| 2009/0257379 A1 | 10/2009 | Robinson et al. | |
| 2009/0310554 A1 | 12/2009 | Sun et al. | |
| 2009/0325625 A1 | 12/2009 | Hugl et al. | |
| 2010/0029282 A1 | 2/2010 | Stamoulis et al. | |
| 2010/0087148 A1 | 4/2010 | Srinivasan et al. | |
| 2010/0087149 A1 | 4/2010 | Srinivasan et al. | |
| 2010/0087221 A1 | 4/2010 | Srinivasan et al. | |
| 2010/0296405 A1 | 11/2010 | Madan et al. | |

(Continued)

FOREIGN PATENT DOCUMENTS

| | | |
|---|---|---|
| CA | 2727452 A1 | 1/2010 |
| EP | 1758414 A1 | 2/2007 |
| WO | 2007024895 A2 | 3/2007 |

OTHER PUBLICATIONS

International Preliminary Report on Patentability for application PCT/CA2011/050286, mailed Nov. 21, 2013, 6 pages.

(Continued)

*Primary Examiner* — Rhonda Murphy
(74) *Attorney, Agent, or Firm* — Conley Rose, P.C.; J. Robert Brown, Jr.

(57) ABSTRACT

Devices and methods are provided for using a mobile station to mitigate interference between wireless access points. A mobile station communicates interference mitigation data corresponding to a first and second set of radio resources between a first and second wireless access point (AP). The interference mitigation data is processed by the first wireless AP to resolve conflicts in the claiming, and subsequent assignment, of the first and second radio resource assignments to the mobile station.

16 Claims, 9 Drawing Sheets

(56) References Cited

U.S. PATENT DOCUMENTS

2010/0323711 A1 12/2010 Damnjanovic et al.
2012/0077506 A1 3/2012 Wietfeldt et al.
2014/0003360 A1 1/2014 Novak et al.
2014/0018116 A1 1/2014 Novak et al.

OTHER PUBLICATIONS

International Search Report and Written Opinion dated Feb. 10, 2012 for Application No. PCT/CA2011/050286.
Gage, William Anthony, et al.; U.S. Appl. No. 13/611,392; filed Sep. 12, 2012; Title: System and Method for Mobile Station-Assisted Interference Mitigation.
Gage, William Anthony, et al.; U.S. Appl. No. 13/611,437; filed Sep. 12, 2012; Title: Access Point for Mobile Station-Assisted Interference Mitigation.
Office Action dated Aug. 21, 2014; U.S. Appl. No. 13/611,392, filed Sep. 12, 2012; 35 pages.
Notice of Allowance dated Dec. 11, 2014; U.S. Appl. No. 13/611,392, filed Sep. 12, 2012; 5 pages.
Office Action dated Aug. 18, 2014; U.S. Appl. No. 13/611,474, filed Sep. 12, 2012; 21 pages.
Notice of Allowance dated Dec. 10, 2014; U.S. Appl. No. 13/611,474, filed Sep. 12, 2012; 9 pages.
PCT International Search Report; Application No. PCT/CA2011/050285; Feb. 10, 2012; 5 pages.
PCT Written Opinion of the International Searching Authority; Application No. PCT/CA2011/050285; Feb. 10, 2012; 5 pages.
PCT International Search Report; Application No. PCT/CA2011/050287; Jan. 30, 2012; 4 pages.
PCT Written Opinion of the International Searching Authority; Application No. PCT/CA2011/050287; Jan. 30, 2012; 7 pages.
European Extended Search Report; Application No. 11865013.4; Oct. 9, 2014; 7 pages.
Notice of Allowance dated Feb. 23, 2015; U.S. Appl. No. 13/611,392, filed Sep. 12, 2012; 10 pages.
Notice of Allowance dated Mar. 4, 2015; U.S. Appl. No. 13/611,474, filed Sep. 12, 2012; 10 pages.
European Extended Search Report; Application No. 11865314.6; Mar. 26, 2015; 6 pages.

\* cited by examiner

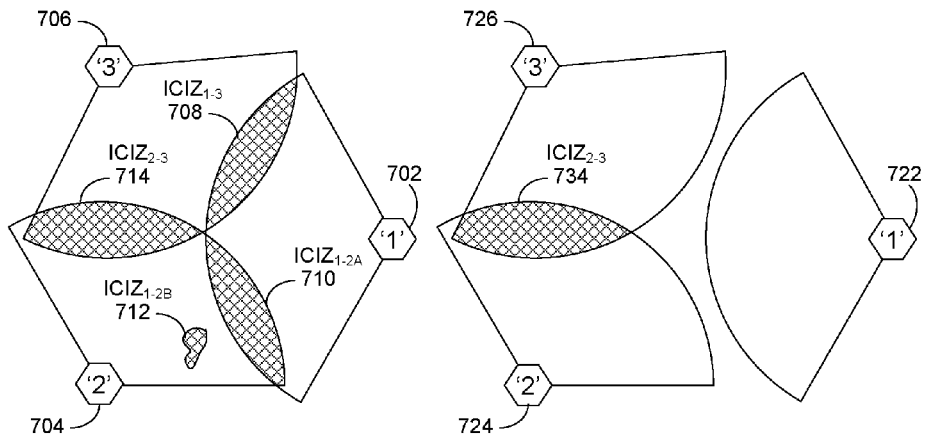
FIGURE 7a    FIGURE 7b
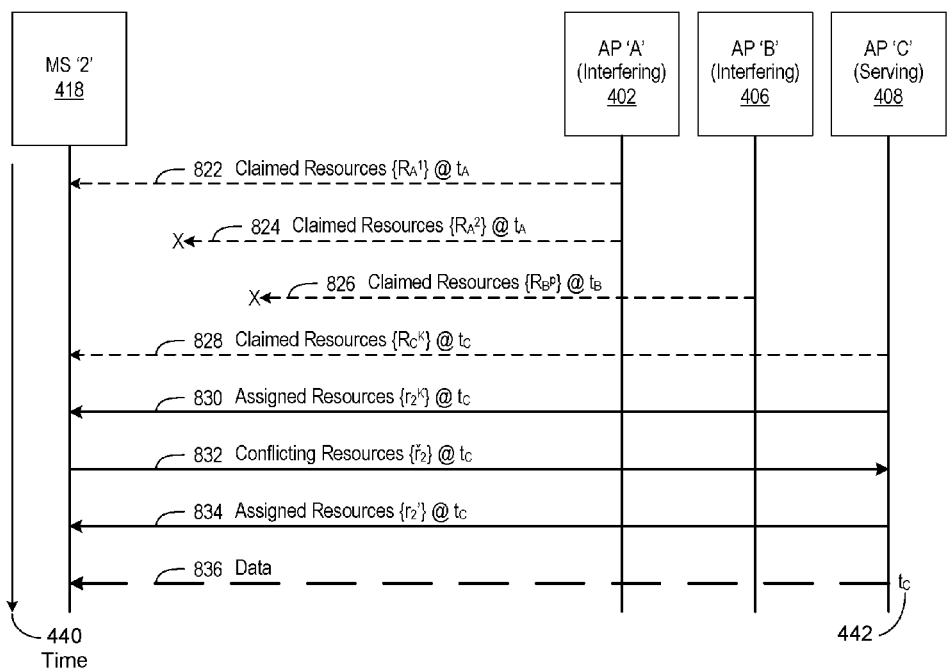
FIGURE 8

MOBILE STATION-ASSISTED INTERFERENCE MITIGATION

CROSS REFERENCE TO RELATED APPLICATIONS

This is a continuation of International Patent Application No. PCT/CA2011/050286, entitled MOBILE STATION-ASSISTED INTERFERENCE MITIGATION, by inventors William Gage and Robert Novak, filed on May 10, 2011, now pending, and incorporated by reference in its entirety.

International Patent Application No. PCT/CA2011/050285, entitled SYSTEM AND METHOD FOR MOBILE STATION-ASSISTED INTERFERENCE MITIGATION, by inventors William Gage and Robert Novak, filed on May 10, 2011, describes exemplary methods and systems and is incorporated by reference in its entirety.

International Patent Application No. PCT/CA2011/050287, entitled ACCESS POINT FOR MOBILE STATION-ASSISTED INTERFERENCE MITIGATION, by inventors William Gage and Robert Novak, filed on May 10, 2011, describes exemplary methods and systems and is incorporated by reference in its entirety.

BACKGROUND

The realization of greater capacity in today's wireless communications environments may require the achievement of a consistently higher signal to interference-plus-noise ratio (SINR) over a significant percentage of a cell's coverage area. Yet achievement of such a goal will require, in general, smaller cells or alternatively, operation in a smaller region of a cell when operating at a given transmit power level. Hence, the current network model of higher-power outdoor macro cells will need to be augmented by lower-power indoor and outdoor micro- and pico-cells. While such a move towards smaller cells will significantly increase the number of access points within a cellular system, it will also lead to significant coverage overlap, both planned and unplanned, between cells.

Co-ordination of transmission and reception in today's cellular systems has been designed with the philosophy of "smart network, dumb user equipment," reflecting the telephone-centric mindset of a previous era. The "smart" network model is based on the premise that the network has a global view, and overall control, of everything that is occurring within the network. However, this assumption breaks down in a heterogeneous coverage environment as it is likely that no single, centralized network entity will have a global view and overall control. As an example, transmission and reception within a given cell is coordinated by the Access Point (AP) responsible for that cell. However, operation across cell boundaries may be un-coordinated due to different administrative domains or to difficulties encountered when communicating between APs. As a consequence, completely un-coordinated operation may ultimately result in unacceptable levels of interference that could negate the benefits of improved signal levels garnered through the use of smaller cells.

BRIEF DESCRIPTION OF THE DRAWINGS

The present disclosure may be understood, and its numerous objects, features and advantages obtained, when the following detailed description is considered in conjunction with the following drawings, in which:

FIGS. 7a-b are a simplified block diagram of power-controlled conflict resolution to mitigate interference between wireless access points;

FIG. 8 shows a process signal flow for power-controlled conflict resolution to mitigate interference between wireless access points;

DETAILED DESCRIPTION

Figure 1:
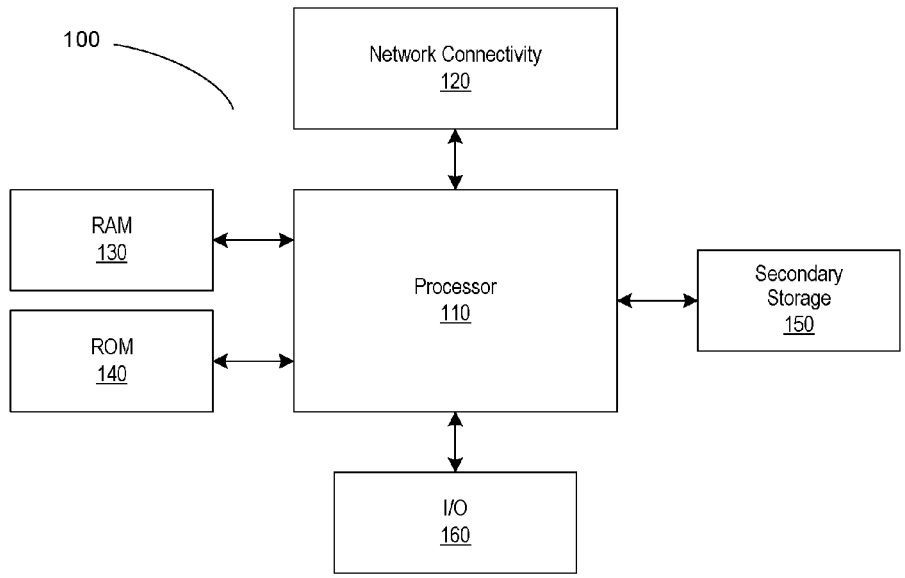
FIG. 1 depicts an exemplary system node in which the present disclosure may be implemented.

The present disclosure is directed in general to wireless communications systems and methods for operating same. In one aspect, the present disclosure relates to devices and methods for using a mobile station to mitigate interference between access points in a heterogeneous wireless network environment.

An embodiment is directed to a mobile station comprising processing logic operable to mitigate interference between a first wireless access point (AP) of a plurality of access points (APs) and at least a second wireless AP of the plurality of APs, processing logic operable to determine a first set of radio resources claimed for assignment by the first AP, processing logic operable to determine a second set of radio resources claimed for assignment by the second AP, and processing logic operable to communicate interference mitigation data associated with the first and second sets of radio resources to the first wireless AP such that interference is mitigated.

An embodiment is directed to a method for mitigating interference between wireless access points, comprising mitigating interference between a first wireless access point (AP)

of a plurality of access points (APs) and at least a second wireless AP of the plurality of APs by using processing logic of a mobile station, determining, by the mobile station, a first set of radio resources claimed for assignment by the first AP, determining, by the mobile station, a second set of radio resources claimed for assignment by the second AP, communicating, by the mobile station, interference mitigation data associated with the first and second sets of radio resources to the first wireless AP such that interference is mitigated.

Devices and methods are provided for using a mobile station to mitigate interference between access points in a heterogeneous wireless network environment.

In various embodiments, the mobile station communicates interference mitigation data acquired from a second wireless access point (AP) to a first wireless AP. In some embodiments the interference mitigation data references a first and second set of radio resources.

In various embodiments, a mobile station receives a first resource claim for a first set of radio resources from a first wireless access point (AP) and receives a second resource claim for a second set of radio resources from a second AP. In one embodiment, interference mitigation data comprising the second set of radio resource from the second resource claim is communicated from the mobile station to the first AP. In another embodiment, interference mitigation data comprising a set of radio resources from the second resource claim that conflict with radio resources from the first resource claim is communicated from the mobile station to the first AP.

In one embodiment, a first set of radio resources is simultaneously claimed by both the first and second wireless AP. The interference mitigation data, which comprises conflicting radio resource claims from the second wireless AP, is processed by the first wireless AP to relinquish its claim on the first set of radio resources. The first wireless AP then assigns radio resources from a second set of radio resources to the mobile station such that interference with the second wireless AP is mitigated. In another embodiment, the interference mitigation data is processed by the first wireless AP to reduce its transmit power level (TPL) on the radio resources assigned to the mobile station from the first set of resources such that interference with the second wireless AP is mitigated. In yet another embodiment, the interference mitigation data is processed by the first wireless AP to defer its use of the first set of radio resources until a time when interference with the second wireless AP will be mitigated.

In some embodiments, the interference mitigation data is processed by the first wireless AP to assign resources from the first set of radio resources to a second mobile station such that interference with the second wireless AP is mitigated. In various embodiments, the mobile station receives a first resource claim for a first set of radio resources from the first AP and receives a second resource claim for a second set of radio resources from the second AP. The mobile station then processes the first and second sets of resource claim data to generate radio resource selection data corresponding to a selection of radio resources from the first set of radio resources, the radio resource selection data comprising a preference assigned by the mobile station to each selected resource. The interference mitigation data, which comprises the radio resource selection data, is processed by the first wireless AP to assign radio resources from the selected set of radio resources to the mobile station according to the preference assigned by the mobile station.

In some embodiments, the mobile station receives a resource claim for a set of radio resources from an AP, the resource claim comprising radio resources assigned by the AP to a plurality of mobile stations served by the AP. In some embodiments, the mobile station receives a resource claim for a set of radio resources from an AP, the resource claim comprising radio resources assigned by the AP to the mobile station. In various embodiments, a wireless access point (AP) transmits a set of claims for radio resources, each claim for radio resources being associated with a different transmit power zone (TPZ). In one embodiment, the AP transmits a first resource claim at a first transmit power level (TPL) associated with a first TPZ and transmits a second resource claim at a second transmit power level (TPL) associated with a second TPZ.

In another embodiment, the AP transmits a first claim for radio resources that comprises the identity of a first TPZ and transmits a second claim for radio resources that comprises the identity of a second TPZ. The AP also transmits a set of power reference signals (PRS) wherein the AP transmits a first PRS at a first transmit power level (TPL) associated with the first TPZ and transmits a second PRS at a second transmit power level (TPL) associated with the second TPZ. The mobile station detects a PRS, identifies the associated TPZ, and matches the identity of the TPZ with the resource claims for either the first or second TPZ.

In yet another embodiment, the AP transmits a first claim for radio resources that comprises pathloss data associated with a first TPZ and transmits a second claim for radio resources that comprises pathloss data associated with a second TPZ. The AP also transmits a power reference signal (PRS) at a TPL known to the mobile station. The mobile station measures the Signal to Interference-plus-Noise Ratio (SINR) of the received PRS, calculates the pathloss of the PRS, and matches the calculated pathloss with the pathloss data and the associated resource claim for either the first or second TPZ.

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, software, a combination of hardware and software, or software in execution. For example, a component may be, but is not limited to being, a processor, a process miming on a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of local area network (LAN) or wide area network (WAN) nodes include computers, packet switches, cable modems, Data Subscriber Line (DSL) modems, and wireless LAN (WLAN) access points. Examples of Internet or Intranet nodes include host computers identified by an Internet Protocol (IP) address, routers and WLAN access points. Likewise, examples of nodes in cellular communication include base stations, relays, base station controllers, home subscriber servers, Gateway GPRS Support Nodes (GGSN), Serving GPRS Support Nodes (SGSN), Serving Gateways (SGW), and Packet Gateways (PGW).

Other examples of nodes include client nodes, server nodes, peer nodes and access nodes. As used herein, a mobile station is a client node and may refer to wireless devices such as mobile telephones, smart phones, personal digital assistants (PDAs), handheld devices, portable computers, tablet computers, and similar devices or other user equipment (UE) that has telecommunications capabilities. Such mobile stations may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as a client node, and at other times, as a server node. In a peer-to-peer or overlay network, a node that actively routes data for other networked devices as well as itself may be referred to as a supernode.

An access point, as used herein, refers to a node that provides a client node access to a communication environment. Examples of wireless access points include cellular network base stations and wireless broadband (e.g., WiFi, WiMAX, etc) access points, which provide corresponding cell and WLAN coverage areas. As used herein, a macrocell is used to generally describe a traditional wide-area cellular network cell coverage area. Such macrocells are typically found in suburban areas, rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office complex, a shopping mall, or a train station. A femtocell, as used herein, currently refers to the smallest commonly accepted area of cellular network coverage. As an example, the coverage area of a femtocell is sufficient for homes or small businesses.

As likewise used herein, a mobile station communicating with a wireless access point associated with a macrocell is referred to as a "macrocell client." Likewise, a mobile station communicating with a wireless access point associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system node 100 suitable for implementing one or more embodiments disclosed herein. In various embodiments, the system node 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may likewise be used to store instructions and data that is read during execution of the instructions. The secondary storage 150 is typically comprised of one or more disk drives or tape drives and may be used for non-volatile storage of data or as an overflow data storage device if RAM 130 is not large enough to hold all working data. Secondary storage 150 may likewise be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
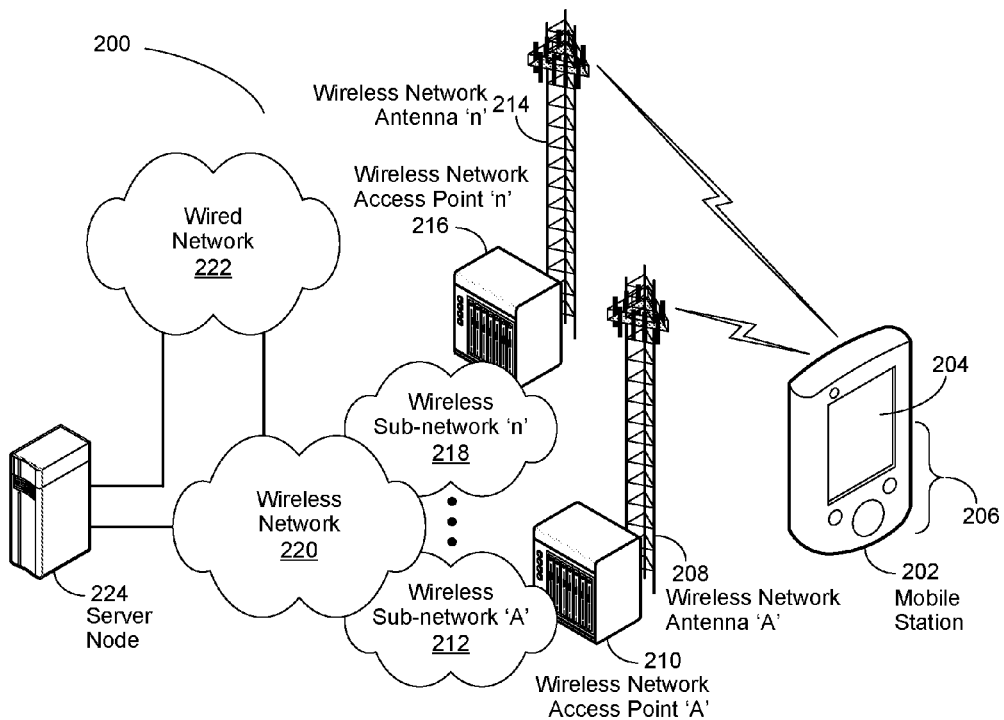
FIG. 2 shows a wireless-enabled communications environment including an embodiment of a mobile station.

FIG. 2 shows a wireless-enabled communications environment including an embodiment of a mobile station as implemented in an embodiment of the disclosure. Though illustrated as a mobile phone, the mobile station 202 may take various forms including a wireless handset, a pager, a smart phone, a personal digital assistant (PDA). In various embodiments, the mobile station 202 may also comprise a portable computer, a tablet computer, a laptop computer, or any computing device operable to perform data communication operations. Many suitable devices combine some or all of these functions. In some embodiments, the mobile station 202 is not a general purpose computing device like a portable, laptop, or tablet computer, but rather is a special-purpose communications device such as a telecommunications device installed in a vehicle. The mobile station 202 may likewise be a device, include a device, or be included in a device that has similar capabilities but that is not transportable, such as a desktop computer, a set-top box, or a network node. In these and other embodiments, the mobile station 202 may support specialized activities such as gaming, inventory control, job control, task management functions, and so forth.

In various embodiments, the wireless network 220 comprises a plurality of wireless sub-networks 'A' 212 through 'n' 218. As used herein, the wireless sub-networks 'A' 212 through 'n' 218 may variously comprise a mobile wireless access network, a wireless local area network or a fixed wireless access network. In these and other embodiments, the mobile station 202 transmits and receives communication signals, which are respectively communicated to and from the wireless network access points 'A' 210 through 'n' 216 by wireless network antennas 'A' 208 through 'n' 214 (e.g., cell towers). In turn, the communication signals are used by the wireless network access points 'A' 210 through 'n' 216 to establish a wireless communication session with the mobile station 202. As used herein, the wireless network access points 'A' 210 through 'n' 216 broadly refer to any access point of a wireless network. As shown in FIG. 2, the wireless network access points 'A' 210 through 'n' 216 are respectively coupled to wireless sub-networks 'A' 212 through 'n' 218.

In various embodiments, the wireless sub-networks 'A' 212 through 'n' 218 are coupled to a wired network 222, such as the Internet. Via the wireless sub-networks 'A' 212 through 'n' 218 and the wired network 222, the mobile station 202 has access to information on various hosts, such as the server node 224. In these and other embodiments, the server node 224 may provide content that may be shown on the display 204 or used by the mobile station processor 110 for its operations. Alternatively, the mobile station 202 may access the wireless sub-networks 'A' 212 through 'n' 218 through a peer mobile station 202 acting as an intermediary, in a relay type or hop type of connection. As another alternative, the mobile station 202 may be tethered and obtain its data from a linked device that is connected to the wireless sub-networks 'A' 212 through 'n' 218. Skilled practitioners of the art will recognize that many such embodiments are possible and the foregoing is not intended to limit the spirit, scope, or intention of the disclosure.

Figure 3:
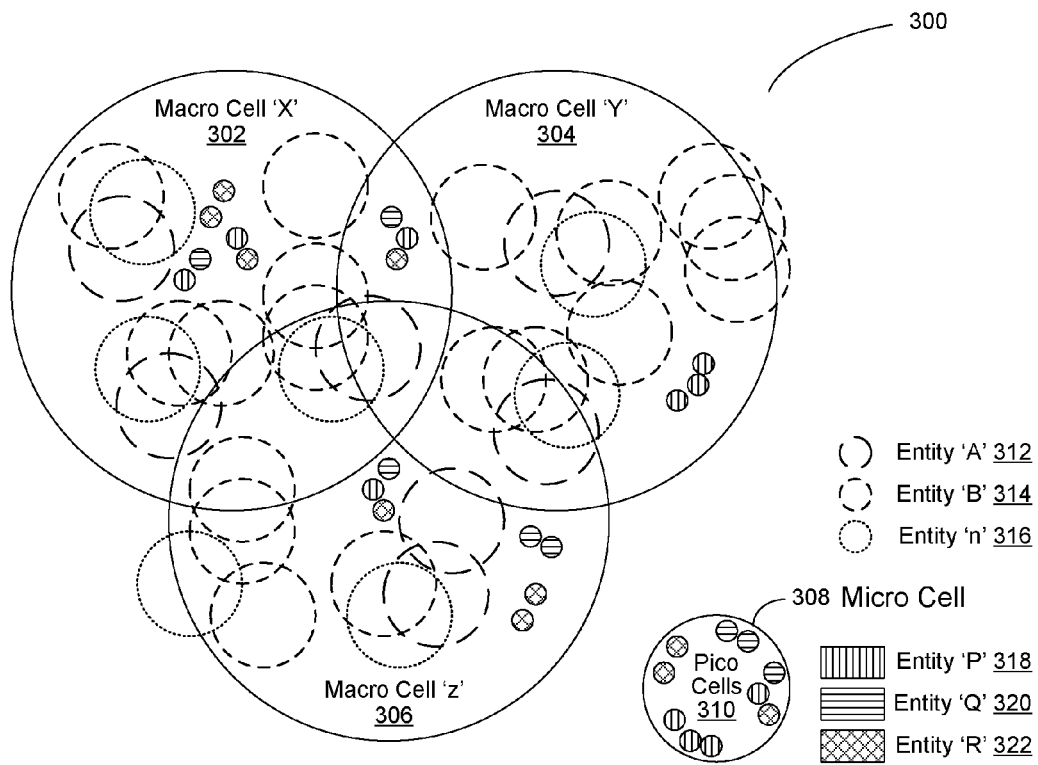
FIG. 3 is a simplified block diagram of a heterogeneous wireless network environment comprising a plurality of macro cells, micro cells, and pico cells.

FIG. 3 is a simplified block diagram of a heterogeneous wireless network environment comprising a plurality of macro cells, micro cells, pico cells and femto cells as implemented in accordance with an embodiment of the disclosure. In this embodiment, a heterogeneous wireless network environment comprises a plurality of wireless network macro cells 'X' 302, 'Y' 304 through 'z' 306. In this and other embodiments, each of the wireless network macro cells 'X' 302, 'Y' 304 through 'z' 306 may comprise a plurality of wireless network micro cells 308, which in turn may comprise a plurality of wireless network pico cells 310. Likewise, the wireless network macro cells 'X' 302, 'Y' 304 through 'z' 306 may also comprise a plurality of individual wireless pico cells 310.

In various embodiments, the micro cells 308 may be associated with business or administrative entities 'A' 312, 'B' 314 through 'n' 316, and the pico cells 310 may likewise be associated with business or administrative entities 'P' 318, 'Q' 320 through 'R' 322. In these various embodiments, the wireless macro cells 'X' 302, 'Y' 304 through 'z', micro cells 308, and pico cells 310 may comprise a plurality of wireless technologies and protocols, thereby creating a heterogeneous operating environment within the wireless network system 300. Likewise, each of the wireless macro cells 'X' 302, 'Y' 304 through 'z' 306, micro cells 308, and pico cells 310 comprises a corresponding wireless access point (AP). As used herein, an AP is a generic term that broadly encompasses wireless LAN access points, macro cellular base stations (e.g., NodeB, eNB), micro- and pico-cells, relay nodes and home-based femtocells (e.g., HeNB), or any telecommunications technology operable to establish and sustain a wireless communication session. As likewise used herein, a "cell" (or "sector") is a portion of the coverage area served by an AP. According, each cell has a set of radio resources that can be associated with that cell through, for example, a unique cell identifier.

Skilled practitioners of the art are aware that future wireless network systems will likely rely on denser deployments of heterogeneous network technologies such as that shown in FIG. 3 to provide higher capacity. However, such higher capacity will, in general, require higher signal to interference-plus-noise ratio (SINR) over a significant percentage of a cell's coverage area. In general, the achievement of higher SINR will require smaller cells or, rather, operation in a smaller region of a cell when transmitting at a given power level. Hence, the current network model of higher power outdoor macro cells will need to be augmented by a set of lower power indoor and outdoor micro- and pico-cells in order to increase system capacity and mobile station throughput.

This move towards smaller cells will significantly increase the number of APs in the system and will also lead to significant coverage overlap, both planned and unplanned, as shown in FIG. 3. As a result, adjacent channel interference can occur when overlapping cells are operating in adjacent portions of the radio spectrum using either the same or different radio access technologies. Likewise, co-channel interference can occur when overlapping cells are operating in the same portion of the radio spectrum.

While transmission and reception within a given cell will be coordinated by its corresponding AP, operation across cell boundaries may be un-coordinated due to the vagaries of radio propagation, differences or incompatibilities between administrative domains, or difficulties encountered in communicating between APs. However, completely un-coordinated operation may ultimately result in unacceptable levels of interference that could negate the benefits of improved signal levels garnered through the use of smaller cells.

Accordingly, there is a corresponding need for the mitigation of interference to enhance performance, which requires cooperation between the aforementioned APs. However, current deployments may not have suitable, or for that matter any, direct communication paths (e.g., physical backhaul) between APs. As a result, interference mitigation cannot occur as there is no mechanism for one AP to cooperate with another AP. Furthermore, realization of real-time channel-dependent cooperation between multiple APs may be unachievable if any available direct communication paths are unable to sustain the required latency and throughput.

Various approaches to this issue are known, including having APs communicate either directly through physical backhaul networks or through a centralized control structure to coordinate communications. One iterative approach is for the AP to coordinate mobile stations to be transmitted to and the resources to be transmitted. Another approach is to have the AP to act as a master manager for a set of radio resources. In one such example, a zone of resources can be specified for coordinated transmission as described in greater detail herein. However, this approach requires not only the aforementioned direct communication between APs, but also a means to converge mobile station selection and resource assignment between various APs. Furthermore, this coordination is also limited to the resources specified within the zone. Moreover, there is the further drawback that either the communications path or the coordination procedure, or both, is too slow to make use of small-scale variation within the channel.

Figure 4:
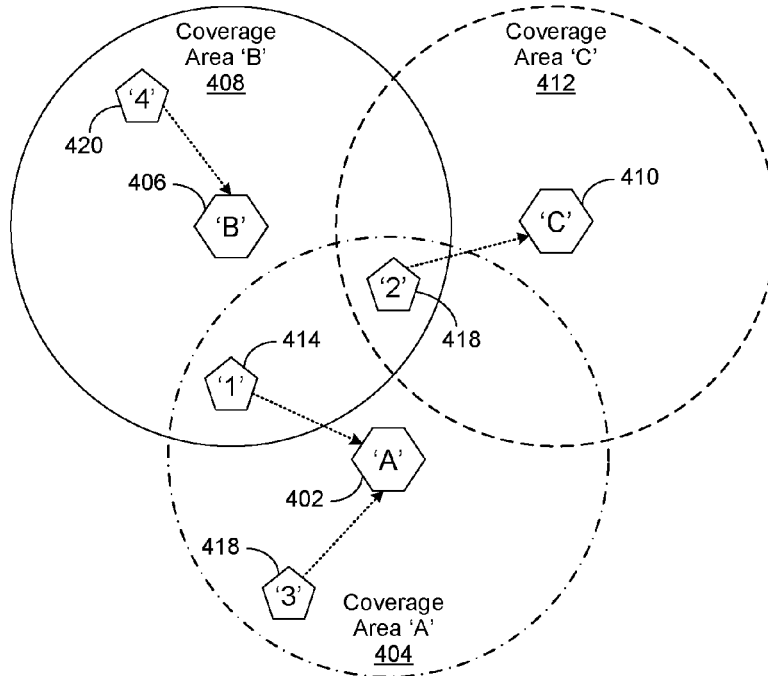
FIG. 4 is a simplified block diagram showing the detrimental effect of co-channel inter-cell interference as mitigated in a single frequency network.

FIG. 4 is a simplified block diagram showing the detrimental effect of co-channel inter-cell interference as mitigated in accordance with an embodiment of the disclosure in a single frequency network. In this embodiment, access points 'A' 402, 'B' 406, and 'C' 410 have corresponding coverage areas 'A' 404, 'B' 408, and 'C' 412. As shown in FIG. 4, mobile station '1' 414 is being served by access point (AP) 'A' 402 but also falls within the coverage area of AP 'B' 408. Likewise, mobile station (MS) '2' 418 is being served by AP 'C' 410 but also falls within the coverage area of AP 'A' 404 and AP 'B' 408. As likewise shown in FIG. 4, MS '3' 418, served by AP 'A' 402, and MS '4' 420, served by AP 'B' 406, are not affected by transmissions from any other AP.

Accordingly, MS '1' 414 may be affected by inter-cell interference if its serving AP (i.e., AP 'A' 402), attempts to transmit information to MS '1' 414 when AP 'B' 406 is also attempting to transmit information to MS '4' 420. Likewise, MS '2' 418 may be affected by inter-cell interference if its serving AP (i.e., AP 'C' 410), attempts to transmit information to MS '2' 418 when either AP 'A' 402 or AP 'B' 406, or both, are attempting to transmit information to the mobile stations they are serving.

Skilled practitioners of the art will recognize that inter-cell interference can be avoided, or at least mitigated, if the APs 'A' 402, 'B' 406, and 'C' 410 are able to coordinate their transmissions to ensure that each AP uses a different set of radio resources during any downlink transmission. One known approach to such coordination is to use an off-line configuration process to provision each AP with the set of radio resources that it is allowed to use. This assignment of radio resources remains in effect until the AP is re-configured. However, this approach is not responsive to changing interference conditions and does not take into account the conditions seen by individual mobile stations.

Those of skill in the art will likewise be aware that coordination in today's cellular systems is based on the premise that the network has a global view of everything that is happening within the coverage area and, ultimately, has total control over everything that is happening within the coverage area. This global view and control may be provided by centralized servers within the radio access network (RAN) infrastructure or through peer-to-peer communications between Access Points.

However, the validity of this assumption is questionable in the heterogeneous wireless network environment shown in FIG. 3, due in part to the partitioning of the network environment into multiple administrative domains. As a result, there may be no single network entity with a global view and with total control over the radio environment. Furthermore, if such an entity exists, it may not be possible to communicate between APs in different domains. Accordingly, even within a single administrative domain, the latency and bandwidth of the RAN backhaul network may preclude real-time communications between APs.

Figure 5:
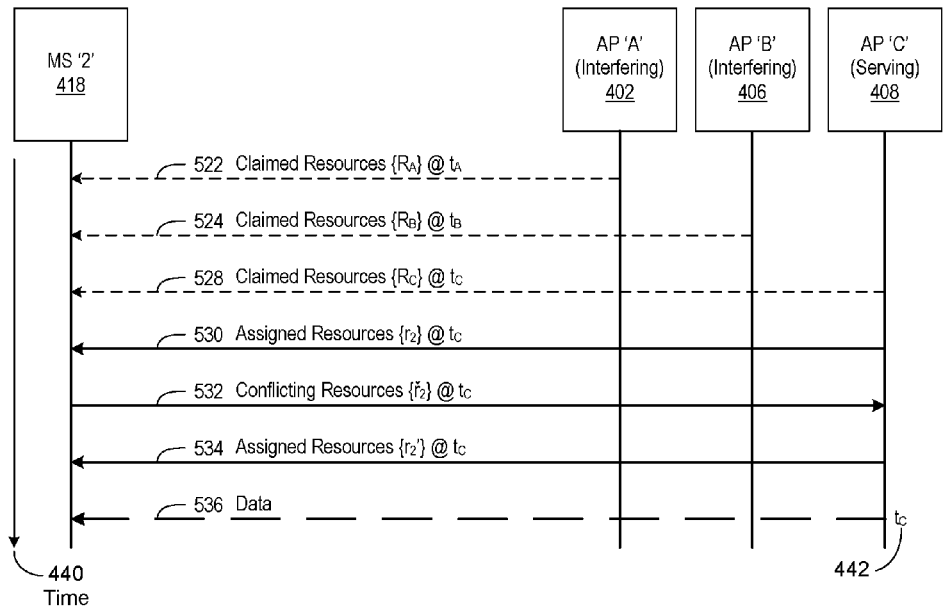
FIG. 5 shows a process signal flow for mobile station-assisted radio resource conflict resolution.

FIG. 5 shows a process signal flow for mobile station-assisted radio resource conflict resolution as implemented in an embodiment of the disclosure to mitigate interference between wireless access points. In various embodiments, one or more mobile stations assist in mitigating the effects of interference by acting as an intermediary between competing access points shown in the heterogeneous wireless network environment of FIG. 3. In such an environment, the mobile station (MS) may be the only entity with visibility of all radio conditions affecting its operation at any given time and in any given location. By observing which radio resources have been claimed by access points covering its current location, a MS can report conflicting claims to its serving access point (AP) to avoid transmissions that use the same set of radio resources.

As shown in FIG. 5, each of the APs 'A' 402, 'B' 406, and 'C' 408' periodically broadcasts information to all mobile stations (e.g., MS '2' 418) within its coverage area. In this and other embodiments, the broadcast information announces the set of radio resources that the AP (e.g., AP 'A' 402, 'B' 406, and 'C' 408') has claimed for use in an upcoming transmission opportunity). For example, in step 522, AP 'A' 402 is claiming the set of resources $\{R_A\}$ for use in an upcoming transmission opportunity at time $t_A$. Likewise, AP 'B' 406 and AP 'C' 408 are respectively claiming the resources $\{R_B\}$ and $\{R_C\}$ for use at times $t_B$ and $t_C$, in steps 524 and 528. In this and other embodiments, these broadcasts are not coordinated. Therefore, steps 522, 524, and 528 may occur in any order and may overlap in time 440. As shown in FIG. 4, MS '2' 418 is in a position to receive these broadcasts from APs 'A' 402, 'B' 406, and 'C' 408. Alternatively, APs 'A' 402, 'B' 406, and 'C' 408 may announce the set of resources that they are not claiming, which would minimize the amount of information being broadcast in a cell that is heavily loaded.

In step 530, AP 'C' 408, the serving AP for MS '2' 418, assigns a set of resources $\{r_2\}$ to MS '2' 418 for use in an upcoming transmission opportunity at time $t_C$ 442. In step 532, using the claimed resource information received from the other APs 'A' 402 and 'B' 406, MS '2' 418 sends a report to its serving AP (i.e., AP 'C' 408) indicating that a subset of the resources $\{\check{r}_2\}$ assigned by AP 'C' 408 conflict with the resources claimed by one or more of the interfering APs (i.e., AP 'A' 402 and AP 'B' 406) during that same transmission opportunity. Likewise, MS '2' 418 may also indicate which resources are currently not claimed in that transmission opportunity by any of the AP observed by MS '2' 418. Using the feedback provided by MS '2' 418, AP 'C' 408 may adjust its resource assignments to avoid resource conflicts with other APs 'A' 402 and 'B' 406 and in step 534 provide MS '2' 418 with an updated set of resources $\{r_2\}$ for use at time $t_C$ 442. In step 536, at the scheduled time $t_C$ 442, the serving AP (i.e., AP 'C' 408) sends the data to MS '2' 418 using the set of radio resources assigned at step 534.

Figure 6:
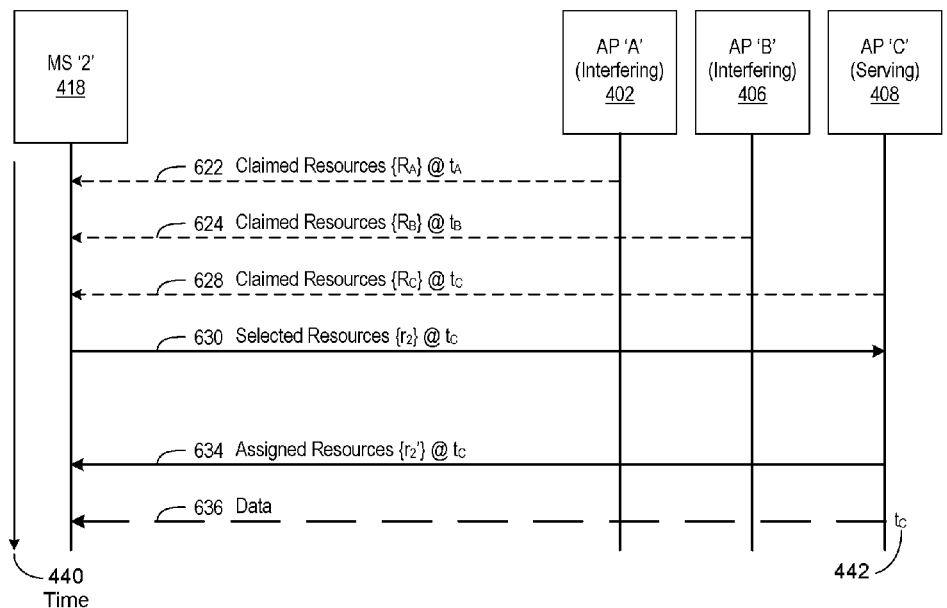
FIG. 6 shows a process signal flow for mobile station-assisted radio resource assignment.

FIG. 6 shows a process signal flow for mobile station-assisted radio resource assignment as implemented in an embodiment of the disclosure to mitigate interference between wireless access points. In various embodiments, a mobile station (MS) first observes which radio resources have been claimed by access points covering its current location, and then reports which resources are available to its serving access point (AP) to minimize the number of conflicting claims for radio resources.

As shown in FIG. 6, each of the APs 'A' 402, 'B' 406, and 'C' 408' periodically broadcasts information to all mobile stations (e.g., MS '2' 418) within its coverage area. In this and other embodiments, the broadcast information announces the set of radio resources that the AP (e.g., AP 'A' 402, 'B' 406, and 'C' 408') has claimed (or not claimed) in an upcoming transmission opportunity. For example, in step 622, AP 'A' 402 is claiming the set of resources $\{R_A\}$ for use in an upcoming transmission opportunity at time $t_A$. Likewise, AP 'B' 406 and AP 'C' 408 are respectively claiming the resources $\{R_B\}$ and $\{R_C\}$ for use at times $t_B$ and $t_C$ in steps 624 and 628. In this and other embodiments, these broadcasts are not coordinated. Therefore steps 622, 624 and 628 may occur in any order and may overlap in time 440. As shown in FIG. 4, MS '2' 418 is in a position to receive these broadcasts from APs 'A' 402, 'B' 406, and 'C' 408.

In step 630, using the claimed resource information received from the other Access Points, MS '2' 418 sends a report to its serving AP (i.e., AP 'C' 408) describing the set of resources $\{r_2\}$ that are currently not claimed in an upcoming transmission opportunity $t_C$ by any of the APs observed by MS '2' 418. The MS '2' 418 may further limit the set of resources $\{r_2\}$ that it is reporting to those resources that provide the best signal quality to MS '2' 418 at the current time and in the current location. In addition, the MS '2' 418 may include a signal quality indication for each of the resources in $\{r_2\}$ or may order the resources in $\{r_2\}$ according to signal quality. In step 634, using the feedback provided by MS '2' 418, AP 'C' 408 assigns a set of resources $\{r_2'\}$ to MS '2' 418 designed to avoid resource conflicts with other APs. At the scheduled time $t_C$ 442 in step 636, the serving AP (i.e., AP 'C' 408) sends the data to MS-'2' 418 using the set of radio resources assigned in step 634.

FIGS. 7a-b are a simplified block diagram of power-controlled conflict resolution as implemented in an embodiment of the disclosure to mitigate interference between wireless access points. In this and other embodiments, a radio resource is defined in terms of one or more dimensions:
Time, indicating the time at which a mobile station (MS) may begin to use the resource and the time at which a MS must stop using that resource;
Frequency, indicating the portion(s) of spectrum that the MS may use to transmit or receive information;
Code, indicating the encoding algorithm and parameters used to transmit or receive information, such as Code Division Multiple Access (CDMA) spreading code or Multiple-Input Multiple-Output (MIMO) spatial stream matrix; and
Space, indicating the region(s) in which the MS may use the resource (e.g. geophysical location, antenna beam, angle of arrival/departure).

Of these dimensions, space is also affected by the transmit power. More specifically, the AP selected as the serving AP and the set of interfering neighbor APs for a given MS will depend upon the power level used to transmit information to and from the MS.

Skilled practitioners of the art will be familiar with an inter-cell interference zone (ICIZ), which is a region where there is overlapping coverage from multiple APs. FIG. 7a shows an example of ICIZs that are created when AP '1' 702, '2' 704, and '3' 706 transmit at their maximum power level. As shown in FIG. 7a, the ICIZs occur mostly at the edges of each cell as typified by $ICIZ_{1-3}$ 708, $ICIZ_{2-3}$ 714, and $ICIZ_{1-2A}$ 710. However, those of skill in the art will also be aware that the vagaries of topology and clutter can affect radio frequency (RF) propagation and produce inter-cell interference zones, such as $ICIZ_{1-2B}$ 712 between AP '1' 702 and AP '2' 704 that may not be constrained to the nominal (e.g., circular) edge of a cell.

Accordingly, FIG. 7b shows an example of the ICIZs that result when AP '1' 722 reduces its transmit power level. In this embodiment, AP '1' 722 has reduced its transmit power to a level where it no longer has inter-cell interference zones with its neighboring APs (i.e., APs '2' 724 and '3' 726). As a result, only one ICIZ (i.e., $ICIZ_{2-3}$ 734) is created. Furthermore, a MS being served by AP '1' 722 within its reduced coverage region will not report any radio resource conflicts. Accordingly, in general, the set of conflicting resources reported by a MS can be minimized, and the set of available resources can be maximized, if the serving AP (e.g., AP 'a' 722) adjusts its transmit power level to match the current location of the MS. To accomplish this, an AP (e.g., AP 'a' 722) is implemented in this and other embodiments to use different transmit power levels, and at each power level, broadcasts the set of resources it is claiming for a given transmission opportunity at that transmit power level.

FIG. 8 shows a process signal flow for power-controlled conflict resolution as implemented in an embodiment of the disclosure to mitigate interference between wireless access points. In this embodiment, access point (AP) 'A' 402 is partially interfering with mobile station (MS) '2' 418, which receives the set of claimed resources for use at time $t_A$ broadcast in step 822 at transmit power level 1 $\{R_A^1\}$. However, MS '2' 418 does not receive the set of claimed resources broadcast in step 824 at transmit power level 2 $\{R_A^2\}$. Likewise, as shown in FIG. 8, because MS '2' 418 does not receive the set of claimed resources broadcast in step 826 by AP B' 406 at transmit power level p $\{R_B^p\}$, AP 'B' 406 does not interfere with MS '2' 418 at that power level.

In some embodiments, the power or reliability of information broadcast by an AP (e.g., APs 'A' 402, 'B' 406, and 'C' 408) to all MSs may be different from that of information transmitted by an AP to a specific MS (e.g., MS '2' 418). Therefore, MS '2' 418 may actually receive and decode the message broadcast in step 826 from AP 'B' 406 claiming a set of resources but may choose instead to ignore the claims based on some signal quality metric. For example, MS '2' 418 may ignore the claims if the Signal to Interference-Plus-Noise Ratio (SINR) for the message claiming $\{R_B^p\}$, transmitted at power level p, is below a predetermined threshold value.

Accordingly, as shown in FIG. 8, MS '2' 418 receives the set of claimed resources $\{R_C^K\}$ for use at time $t_C$ broadcast in step 828 at transmit power level k. In this and other embodiments, these broadcasts are not coordinated. Therefore, steps 822, 824, 826 and 828 may occur in any order and may overlap in time 440. As likewise shown in FIG. 8, AP 'C' 408 assigns a set of resources $\{r_2^k\}$ in step 830 to MS '2' 418 for use in an upcoming transmission opportunity at time $t_C$ 442 using transmit power level k. Therefore, the conflict report sent by MS '2' 418 in step 832 will be based only on the conflicts, if any, detected in the resources $\{R_A^T\}$ claimed by AP 'A' 402 in step 822 using transmit power level 1. The resources used by AP 'A' 402 at transmit power level 2 and by AP 'B' 406 at transmit power level p do not interfere with the resources assigned to MS '2' 418 at transmit power level k. Accordingly, using the feedback provided by MS '2' 418, AP 'C' 408 may adjust its transmit power level to avoid resource conflicts with other APs 'A' 402 and 'B' 406 and in step 834 provide MS '2' 418 with an updated set of resources $\{r_2'\}$ for use at time $t_C$ 442. In step 836, at the scheduled time $t_C$ 442, the serving AP (i.e., AP 'C' 408) sends the data to MS '2' 418 using the set of radio resources assigned at step 834.

Figure 9:
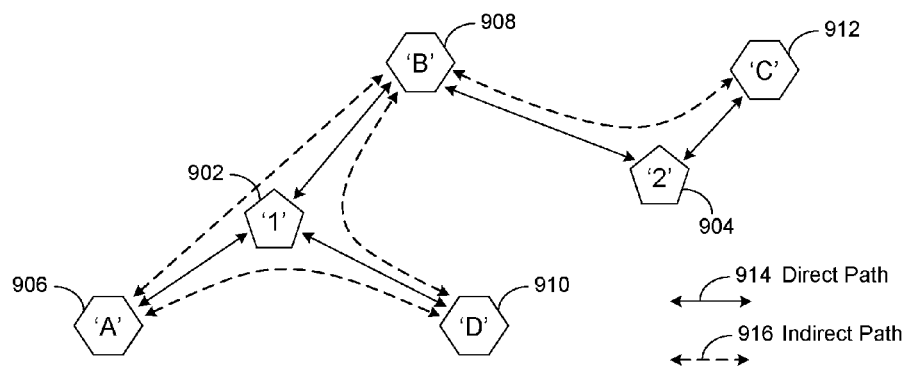
FIG. 9 is a simplified block diagram of a mobile station-assisted inter-access point (AP) communications environment.

FIG. 9 is a simplified block diagram of a mobile station-assisted inter-access point (AP) communications environment as implemented in accordance with an embodiment of the disclosure to mitigate interference between wireless APs. In this and other embodiments, the move towards smaller cells and a mixture of heterogeneous radio access technologies increases the number of APs within a coverage area and likewise leads to coverage overlaps, both planned and unplanned, between cells. For example, wireless access facilities may be owned and deployed by numerous entities including cellular service providers, enterprise businesses, municipal governments, local retailers and individual home owners. With a corresponding proliferation of low power micro-, pico-, and femto-cells, it is unlikely that a single network entity will have a global view and total control of the overall radio environment. In fact, it is likely that an individual mobile station (MS) may be the only entity with viable and accurate visibility of the radio environment in which it operates at a given location.

More specifically, communications between APs within a given coverage area may be difficult, if not impossible, due to a number of factors. For example, the APs may be in different Radio Access Networks (RANs) that are owned and/or operated by different business entities. Likewise, the APs may be in different RANs with no communications path between each other. Conversely, the APs may be in the same RAN but the backhaul infrastructure may not provide a communications path between the APs. As another example, the backhaul infrastructure may not offer the bandwidth or latency necessary to meet inter-AP signaling requirements, or the APs may not be able to receive radio transmissions from one another, precluding direct communication over the air.

Therefore, the only communications path which can be consistently relied upon is the one directly between an AP in a RAN and a MS. By extension, the only viable communication path between APs in the same RAN, or in different RANs, may be indirectly via a Mobile Station that has a direct communications path with each of the corresponding APs. Accordingly, the unique position and capabilities of a MS is implemented in these various embodiments to detect and coordinate the usage of radio resources amongst APs to avoid the detrimental effects of inter-cell interference.

As shown in FIG. 9, MS '1' 902 has a direct 914 communications path to APs 'A' 906, 'B' 908, and 'D' 910, while MS '2' 904 has a direct 914 communications path to AP 'B' 908 and 'C' 912. Accordingly, interaction between APs 'A' 906 and 'B' 908 can occur via MS '1' 902. In various embodiments, direct 914 communications paths may or may not exist between the APs 'A' 906, 'B' 908, 'C' 912, and 'D' 910, such as via a backbone network. However, this is not always the case, especially across access network boundaries. As likewise shown in FIG. 9, the indirect 916 communication paths provided by MS '1' 902 between APs 'A' 906, 'B' 908, and 'D' 910, and by MS '2' 904 between APs 'B; 908 and 'C' 912, is implicit rather than explicit. For example, if MS '1' 902 receives information from AP 'A' 906, it may automatically forward some or all of the information to AP 'B' 908 or to AP 'D' 910 without the need for AP 'A' 906 to take any action other than to communicate with MS '1' 902. Accordingly, MS '1' 902 and '2' 904 enable the co-ordination and co-operation that may be necessary between APs 'A' 906, 'B' 908, 'C' 912, and 'D' 910 both within and across their various technology and administrative domains.

Figure 10:
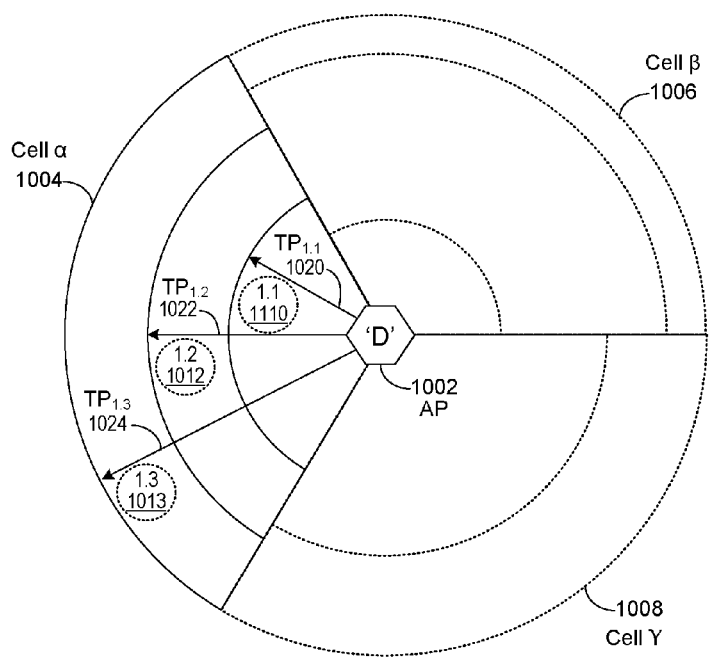
FIG. 10 simplified topological diagram showing downlink transmit power zones.

FIG. 10 is a simplified topological diagram showing the implementation of downlink transmit power zones in accordance with an embodiment of the disclosure to mitigate interference between wireless access points. In this and other embodiments, inter-cell interference (ICI) results when unwanted signals from neighboring transmitters arrive at a receiver concurrently with a desired signal from the intended transmitter. Skilled practitioners of the art will be aware that ICI has traditionally been managed through the use of orthogonal radio resources, differing in time, frequency or code, in each of the neighboring cells (e.g., cell 'α' 1004, 'β' 1006, and γ 1008). Those of skill in the art will likewise be aware that in a single frequency network, such as Long Term Evolution (LTE) with an N=1 frequency reuse pattern, spatial separation techniques such as beam-switching and beam-forming may also be used to avoid co-channel interference. Likewise, transmit power control (TPC) can also be used as a spatial separation technique.

As shown in FIG. 10, a transmit power zone (TPZ) is that portion of the cell coverage area that receives an acceptable Signal to Interference-Plus Noise Ratio (SINR) when the transmitter (e.g. AP 'D' 1002) broadcasts at a given power level. As likewise shown in FIG. 10, downlink TPZs in three cells, or sectors, 'α' 1004, 'β' 1006, and 'γ' 1008 are controlled by AP 'D' 1002. In this embodiment, cell 'α' 1004 comprises TPZs '1.1' 1110, '1.2' 1012, and '1.3' 1013, which respectively include regions covered at transmit powers '$TP_{1.1}$' 1020, '$TP_{1.2}$' 1022, and '$T_{1.3}$' 1024. In general, '$TP_{1.1}$' 1020, <'$TP_{1.2}$' 1022, <'$TP_{1.3}$' 1024≥$TP_{MAX}$ such that, in general, TPZ '1.1' 1110 ⊂ TPZ '1.2' 1012 ⊂ TPZ '1.3' 1013.

However, skilled practitioners of the art will realize that the vagaries of topology and clutter can affect radio frequency (RF) propagation, which results in coverage holes and in coverage "fingers" that extend beyond the nominal (e.g., circular) edge of a zone. Accordingly, TPZs may be statically defined as part of the AP configuration or they may be dynamically defined by the AP according to the location of the MSs scheduled for servicing by the AP within a given transmission time interval. Likewise, the number of TPZs and the corresponding transmission power associated with each TPZ can be dynamically varied from one cell to another (e.g. cell 'β' 1006 and cell 'γ' 1008).

Figure 11:
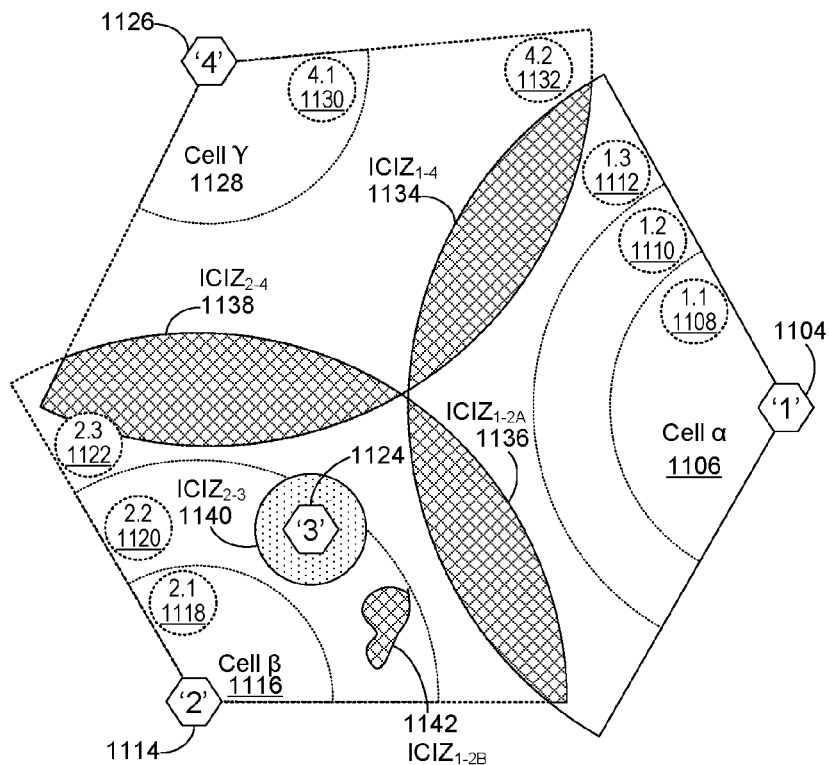
FIG. 11 is a simplified topological diagram showing inter-cell interference zones.

FIG. 11 is a simplified topological diagram showing the implementation of inter-cell interference zones in accordance with an embodiment of the disclosure for mitigating interference between wireless access points. In this embodiment, access points '1' 1104, '2' 1114, and '4' 1126 respectively comprise cells 'α' 1106, 'β' 1116, and 'γ' 1128. In turn, cell 'α' 1106 comprises transmit power zones 'TPZ$_{1.1}$' 1108, 'TPZ$_{1.2}$' 1110, and 'TPZ$_{1.3}$' 1112. Likewise, cell 'β' 1116 comprises transmit power zones 'TPZ$_{2.1}$' 1118, 'TPZ$_{2.2}$' 1120, and 'TPZ$_{2.3}$' 1122, while cell 'γ' 1128 comprises transmission power zones 'TPZ$_{4.1}$' 1130 and 'TPZ$_{4.2}$' 1132.

Skilled practitioners of the art will be aware that an inter-cell interference zone (ICIZ), as described in greater detail herein, likewise refers to a region where there are overlapping transmit power zones from different cells. For example, as shown in FIG. 11, 1136 between AP '1' 1104 and AP '2' 1114 occurs mostly at the edges of the neighboring cells in portions of transmit power zone 'TPZ$_{1.3}$' 1112 in AP '1' 1104 and in portions of 'TPZ$_{2.3}$' 1122 in AP '2' 1114. Likewise, 'ICIZ$_{2-4}$' 1138 between AP '4' 1126 and AP '2' 1114 occurs mostly at the edges of the neighboring cells in portions of transmit power zone 'TPZ$_{4.2}$' 1132 in AP '4' 1126 and in portions of 'TPZ$_{2.3}$' 1122 in AP '2' 1114. The 'ICIZ$_{1-4}$' 1134 between AP '4' 1126 and AP '1' 1104 likewise occurs mostly at the edges of the neighboring cells in portions of transmit power zone 'TPZ$_{4.2}$' 1132 in AP '4' 1126 and in portions of 'TPZ$_{1.3}$' 1112 in AP '1' 1104.

However, skilled practitioners of the art will be aware that the vagaries of topology and clutter can affect RF propagation and produce inter-cell interference zones that may not be constrained to the nominal (e.g., circular) edge of a cell. For example, as shown in FIG. 11, 'ICIZ$_{1-2B}$' 1142 represents a coverage overlap between 'TPZ$_{2.2}$' 1120 in AP '2' 1114 and 'TPZ$_{1.3}$' 1112 in AP '1' 1104 where the coverage of TPZ$_{1.3}$ 1112 has extended beyond its nominal (e.g., circular) edge due to the local radio frequency (RF) propagation environment. Those of skill in the art will likewise realize that successive underlays involving combinations of micro-, pico- and femto-cells may likewise result in an inter-cell interference zone that encompasses an entire cell. For example, as shown in FIG. 11, AP '3' 1124 is a microcell that is completely overlaid by cell 'β' 1116 AP '2' 114. Accordingly, 'ICIZ$_{2-3}$' 1140 between AP '2' 1114 and AP '3' 1124 encompasses all of the coverage area of AP '3' 1124 and portions of 'TPZ$_{2.2}$' 1120 and 'TPZ$_{2.3}$' 1122 in AP '2' 1114.

Figure 12:
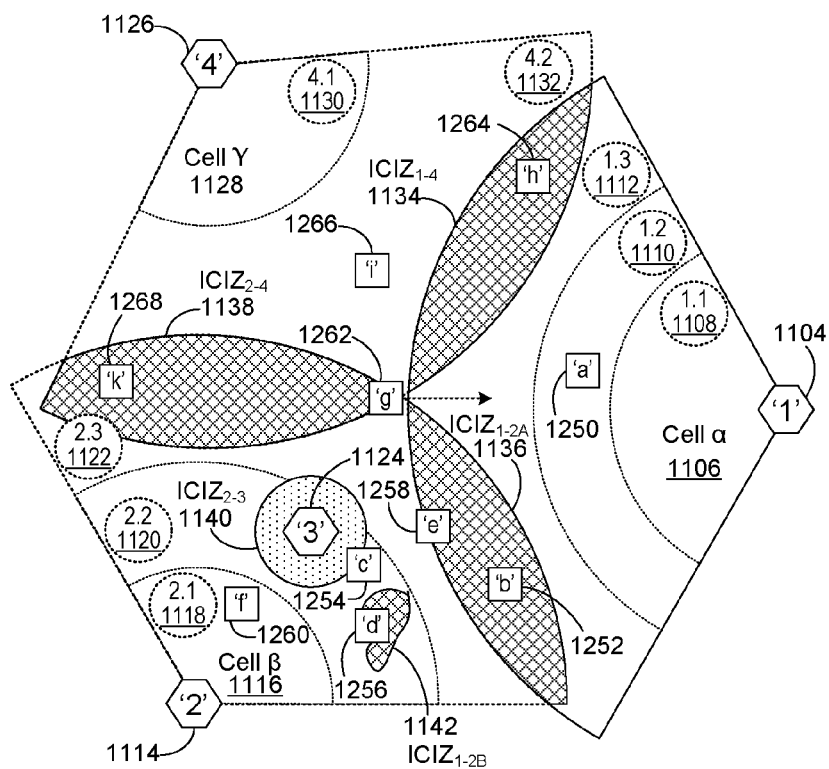
FIG. 12 is a simplified topological diagram showing mobile station serving and contending cell sets.

FIG. 12 is a simplified topological diagram showing the implementation of mobile station serving and contending cell sets in accordance with an embodiment of the disclosure for mitigating interference between wireless access points. In this embodiment, access points '1' 1104, '2' 1114, and '4' 1126 respectively comprise cells 'α' 1106, 1116, and 'γ' 1128. In turn, cell 'α' 1106 comprises transmit power zones 'TPZ$_{1.1}$' 1108, 'TPZ$_{1.2}$' 1110, and 'TPZ$_{1.3}$' 1112. Likewise, cell 'β' 1116 comprises transmit power zones 'TPZ$_{2.1}$' 1118, 'TPZ$_{2.2}$' 1120, and 'TPZ$_{2.3}$' 1122, while cell 'γ' 1128 comprises transmission power zones 'TPZ$_{4.1}$' 1130 and 'TPZ$_{4.2}$' 1132.

As shown in FIG. 12, the inter-cell interference zone (ICIZ) 'ICIZ$_{1-2A}$' 1136 between AP '1' 1104 and AP '2' 1114 occurs mostly at the edges of the neighboring cells in portions of transmit power zone 'TPZ$_{1.3}$' 1112 in AP '1' 1104 and in portions of 'TPZ$_{2.3}$' 1122 in AP '2' 1114. Likewise, 'ICIZ$_{2-4}$' 1138 between AP '4' 1126 and AP '2' 1114 occurs mostly at the edges of the neighboring cells in portions of transmit power zone 'TPZ$_{4.2}$' 1132 in AP '4' 1126 and in portions of 'TPZ$_{2.3}$' 1122 in AP '2' 1114. The 'ICIZ$_{1-4}$' 1134 between AP '4' 1126 and AP '1' 1104 likewise occurs mostly at the edges of the neighboring cells in portions of transmit power zone 'TPZ$_{4.2}$' 1132 in AP '4' 1126 and in portions of 'TPZ$_{1.3}$' 1112 in AP '1' 1104.

As likewise shown in FIG. 12, 'ICIZ$_{1-2B}$' 1142 represents a coverage overlap between 'TPZ$_{2.2}$' 1120 in AP '2' 1114 and 'TPZ$_{1.3}$' 1112 in AP '1' 1104 where the coverage of 'TPZ$_{1.3}$' 1112 has extended beyond its nominal (e.g., circular) edge due to the local radio frequency (RF) propagation environment. Likewise, AP '3' 1124 is a microcell that is completely overlaid by cell 'β' 1116 AP '2' 114. Accordingly, 'ICIZ$_{2-3}$' 1140 between AP '2' 1114 and AP '3' 1124 encompasses all of the coverage area of AP '3' 1124 and portions of 'TPZ$_{2.2}$' 1120 and 'TPZ$_{2.3}$' 1122 in AP '2' 1114.

As shown in FIG. 12, mobile station (MS) 'a' 1250 is operating within 'TPZ$_{1.2}$' 1110 of cell 'a' 1106, while MS 'b' 1252 is operating within 'ICIZ$_{1-2A}$' 1136, and MS 'c' 1254 is operating within 'TPZ$_{2.2}$' 1120 of cell 'β' 1116 as well as within 'ICIZ$_{2-3}$' 1140. Likewise MS 'd' 1256 is operating within 'TPZ$_{2.2}$' 1120 of cell 'β' 1116 as well as within 'ICIZ$_{2-3}$' 1140, while MS 'e' 1258 is operating within 'TPZ$_{2.2}$' 1120 of cell 'β' 1116 and MS 'f' 1260 is operating within 'TPZ$_{4.2}$' 1132 of cell 'γ' 1128. As likewise shown in FIG. 12, MS 'g' 1262 is operating within 'ICIZ$_{2-4}$' 1138, while MS 'h' 1264 is operating within 'ICIZ$_{1-4}$' 1134. Likewise, MS 'i' 1266 is operating within 'TPZ$_{4.2}$' 1132 of cell 'γ' 1128 and MS 'k' 1268 is operating within 'ICIZ$_{2-4}$' 1138.

Skilled practitioners of the art will be aware that a mobile station's serving cell set (MSCS) is the collection of one or more cells where the mobile station (MS) is actively exchanging, or planning to exchange, traffic with those cells. This includes the cell that is currently serving the MS as well as any cells that are handover targets. For example, in this embodiment, MS 'g' 1262 is in transition from 'TPZ$_{4.2}$' 1132 in cell 'γ' 1128 of AP '4' 1126 to 'TPZ$_{1.3}$' 1112 in cell 'α' 1106 of AP '1' 1104. Accordingly, the MSCS for MS 'g' 1262 has two members—cell 4-γ, its serving cell, and cell 1 α, its target cell.

Accordingly, skilled practitioners of the art will recognize that a mobile station cell coverage zone (MCCZ) is the collection of transmit power zones that provide coverage to the MS within each cell of the MSCS. Likewise, in general, the MCCZ will include the TPZ with the minimum power to reach the MS as well as the TPZs operating at a higher power transmit power level. For example, as shown in FIG. 12, MS 'a' 1250 operating within 'TPZ$_{1.2}$' 1110 in cell 'α' 1106 of AP '1' 1104 will have a MCCZ that includes cell 'α' 1106 of AP '1' 1104 as its current serving cell and a cell coverage zone in cell 1- a that includes 'TPZ$_{1.2}$' 1110 as well as 'TPZ$_{1.3}$' 1112. However, 'TPZ$_{1.1}$' 1108 would not be a member of the MCCZ for MS 'a' 1250 due to its lower transmit power. From the foregoing, it will be apparent that the cell MCCZ for a given MS is based on the ability of the MS to detect and decode a signal above a certain SNR threshold. This, in turn, is based on the combination of transmit power from an AP and the sensitivity of the receiver implemented within the MS.

Those of skill in the art will recognize that a mobile station contending cell set (MCCS) is the collection of one or more cells where the MS is able to decode the cell control information broadcast from an AP. As such, the MCCS comprises members of the MSCS as well as interfering cells from neighboring APs. Likewise, the MS's ICIZ is represented by the overlapping transmit power zones of the MCCS. In various embodiments, the MS may not be actively exchanging, or planning to exchange, traffic with all of the cells in its MCCS, therefore the MCCS may include cells that are not members of the MS's serving cell set.

In the example of FIG. 12, MS 'c' 1254 will have a serving cell set that includes the omni-directional cell of AP '3' 1124 as its serving cell and a cell coverage zone in AP '3' 1124 that includes its corresponding single transmit power zone. Accordingly, MS 'c' 1254 will have AP '2' 1114 and AP '3' 1124 in its contending cell set and will be in 'ICIZ$_{2-3}$' 1140, which includes 'TPZ$_{2.2}$' 1120 and TPZ$_{2.3}$' 1122 of AP '2' 1114 and the single transmit power zone of AP '3' 1124.

Skilled practitioners of the art will likewise realize that the vagaries of topology and clutter may produce propagation and shadowing effects that produce coverage holes within a cell and extend coverage beyond the nominal (e.g., circular) edge of a cell. For example, as likewise shown in FIG. 12, a MS 'd' 1256 operating within '$ICIZ_{1-2B}$' 1142 may have a MCCS with cell 'β' 1116 of AP '2' 1114 as its current serving cell and a cell coverage zone in cell 2-β that includes an interior transmit power zone, '$TPZ_{2.2}$' 1120, rather than a cell edge transmit power zone. However, MS 'd' 1256 will have cell 'α' 1106 of AP '1' 1104 and cell 'β' 1116 of AP '2' in its MCCS and will be within '$ICIZ_{1-2B}$' 1142, which that includes both '$TPZ_{1.3}$' 1112 and '$TPZ_{2.2}$' 1120.

Figure 13:
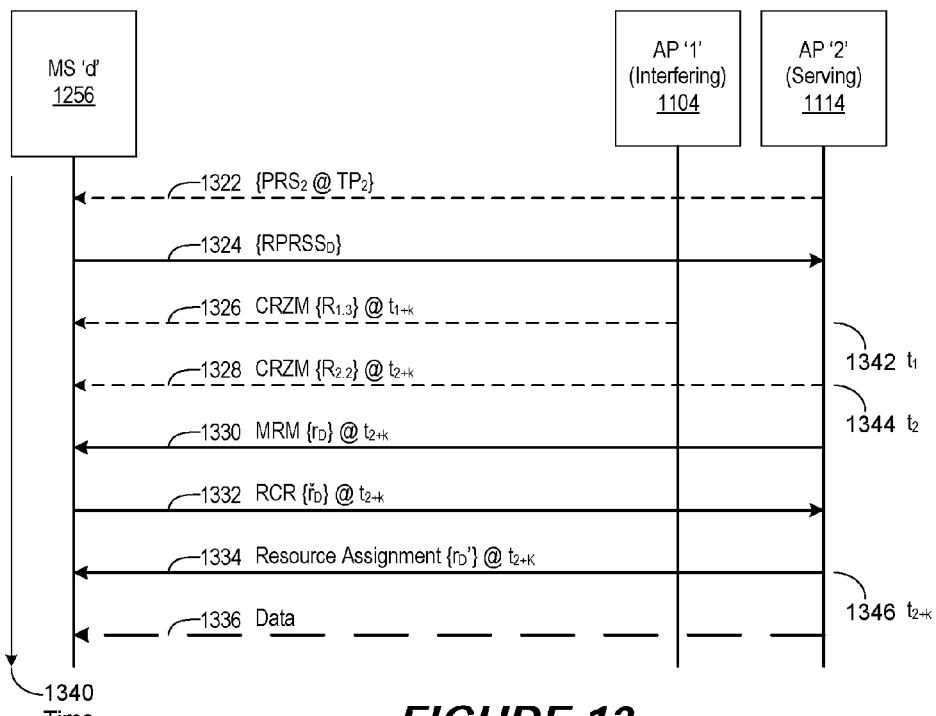
FIG. 13 shows a process signal flow for interference mitigation procedures.

FIG. 13 shows a process signal flow for interference mitigation procedures as implemented in an embodiment of the disclosure to mitigate interference between wireless access points. In various embodiments, an access point (AP) periodically broadcasts during time 1340 a set of power reference signals (PRS) for each cell at the highest power level allowed for the cell or at some reduced power level determined by administrative policies or power management algorithms. In this embodiment, AP '2' 1114 broadcasts a set of PRS {$PRS_2$} in step 1322 at transmit power (TP) level $TP_2$ that defines the extent of coverage for this cell.

In this and other embodiments, each mobile station (MS), such as MS 'd' 1256, is responsible for using the PRS to identify the transmit power zone (TPZ) in which it is currently operating. Likewise, the MS identifies the time and frequency radio resources assigned to the set of PRS using cell control information, such as a Long Term Evolution (LTE) System Information Block, that is periodically broadcast throughout the cell by an AP. In these various embodiments, coordination mechanisms between APs (e.g. based on the physical cell ID) may be required to ensure that reference signals in neighboring cells can be distinguished, such as by using an orthogonal set of resources. Likewise, the functionality of the power reference signals may be combined with other information broadcast by the AP in some radio access technologies, such as in the Long Term Evolution (LTE) Physical Broadcast Channel (PBC).

In this embodiment, the MS 'd' 1256 performs Signal to Interference-plus-Noise Ratio (SINR) measurements on the power reference signals from each of the cells (e.g., AP '2' 1114) in its serving set. The MS 'd' 1256 then reports the received power reference signal strength {$RPRSS_D$} it has measured to AP '2' 1114 in step 1322 when the SINR of the power reference signal is above an acceptable value. In turn, AP '2' 1114 computes the amount of path loss encountered by the MS in its current location, which is the difference between the transmit power level ($TP_2$) and the reported RPRSS for each PRS, and correlates the losses reported by multiple MSs to dynamically group them into transmit power zones for radio resource scheduling.

In addition to the power reference signals, the AP for each cell (e.g., AP '1' 1104 and AP '2' 1114) also periodically broadcasts a claimed zone resource map (CZRM) for each transmit power zone (TPZ). The CRZM indicates which radio resources, such as Orthogonal Frequency-Division Multiplexing (OFDM) sub-carriers it has claimed for use in an upcoming transmission opportunity (TXOP). As shown in FIG. 13, AP '1' 1104 and AP '2' 1114 respectively broadcast such a CRZM signal in steps 1326 at time $t_1$ 1342 and step 1328 at time $t_2$ 1344. Logically, the CZRM contains information for each radio resource in the uplink direction, the downlink direction, or both, indicating whether that resource has or has not been claimed by this AP for use in that TXOP.

Those of skill in the art will be aware that a transmission opportunity is a sequence of one or more transmission time intervals (TTIs) in an upcoming frame or sequence of frames. The resources being claimed in that TXOP may be committed resources that have already been scheduled by the AP or they may be anticipated resources that the AP may be trying to reserve as a block for later allocation to individual Stations. Committed resources will reflect actual resource requirements within that TXOP while anticipated resources will reflect a forecast of resource requirements within that TXOP.

In this and other embodiments, each AP (e.g. AP '1' 1104 and '2' 1114) is responsible for ensuring that there are no radio resource assignment conflicts across the transmit power zones of its own cells. For example, in FIG. 12, AP '2' 1114 will ensure that resources assigned for use in '$TPZ_{2.1}$' 1118 are not simultaneously assigned for use in '$TPZ_{2.3}$' 1122 within a given transmission time interval. In addition, as described in greater detail herein, an AP may receive reports from its respective MSs of resource claims made in neighboring cells that can be used by the AP to minimize radio resource assignment conflicts.

Since resources assigned for use in an inner (e.g., lower power) TPZ will not be simultaneously used in an outer (e.g., high power) TPZ within the same cell, APs can claim resources in the TPZ of an edge region without fear of conflict if they know that those resources have already been committed for use by a neighboring AP in one of its non-overlapping inner TPZs. Therefore, the CZRM for a transmit power zone indicates how each radio resource in the cell has been claimed by the controlling AP relative to that TPZ as follows:

Not claimed. The resource has not been claimed for use within this cell. However, the Access Point may subsequently claim this resource if needed to support instantaneous demand from its served MSs or to avoid resource conflicts with neighboring cells.

Claimed in a lower powered TPZ. The resource has been claimed for use in a lower-powered TPZ within this cell, therefore the AP will not make a subsequent claim for this resource within this TPZ.

Claimed in a higher powered TPZ. The resource has been claimed for use in a higher-powered TPZ within this cell, therefore the AP will not make a subsequent claim for this resource within this TPZ. However, a neighbouring cell that attempts to use this resource may encounter increased interference.

Claimed in this TPZ. The resource has been claimed for use within this TPZ

The AP (e.g., AP '2' 1114) controlling a cell then sends in step 1330 a mobile station resource map (MRM) to each MS (e.g. MS 'd' 1256) that require radio resources. The MRMs indicate which resources (e.g. OFDM sub-carriers) it has tentatively scheduled for use by that MS (e.g., MS 'd' 1256) in an upcoming transmission opportunity. Those of skill in the art will realize that the MRM is a set of potential radio resources and may not reflect the actual resources subsequently assigned to the MS (e.g., MS 'd' 1256) during that transmission opportunity. For example, the MRM may identify the sub-band(s) from which resources will be allocated, while the resources actually scheduled for use by the MS in that TXOP may be a subset of those resources.

When a MS determines that it is operating in an inter-cell interference zone (ICIZ), it compares the claimed zone resource maps from each AP in its contending cell set to the MRM received from its serving AP. In this and other embodiments, AP broadcasts may not be synchronized in the time domain. Therefore, the TXOP reference in a CZRM is relative to the originating AP. Before comparing MRMs, the MS must time-align the TXOP reference in the MRM with the TXOP reference in the CZRMs from the neighboring cells.

If the MS (e.g., MS 'd' 1256) finds that resources allocated in the MRM conflict with resources claimed in one or more of the CZRMs, then the MS sends a resource contention report (RCR) to its serving AP (e.g., AP '2' 1114) in step 1332 indicating which resources are being contended and providing a set of alternate resources that are not in contention. At the time of the designated TXOP, the serving AP (e.g., AP '2' 1114) in step 1334 may avoid potential interference by not scheduling the use of the contended resources in that TPZ in that TXOP. The serving AP (e.g., AP '2' 1114) may either allocate alternate resources to the MS (e.g., MS 'd' 1256) in that TXOP or re-schedule resources for the MS to a later TXOP. However, the serving AP (e.g., AP '2' 1114) may use the contended resources in a different TPZ during that TXOP if no conflicts are reported in that TPZ.

In step 1330, the serving AP (e.g., AP '2' 1114) may also send a MRM to a MS that only indicates the transmission opportunity that the serving AP has tentatively scheduled for use by that MS. Using the CZRMs received from neighboring cells in step 1326 at $t_1$ 1342, and signal quality measurements made by the MS (e.g., MS 'd' 1256), the RCR sent by the MS in step 1332 provides the serving AP with a selection of radio resources within that TXOP that are most suitable for use by the MS. At step 1334, the serving AP (e.g., AP '2' 1114) assigns radio resources to the MS (e.g., MS 'd' 1256) based on the selections made by that MS.

In step 1330, the serving AP (e.g., AP '2' 1114) may also broadcast a MRM to a group of Mobile Stations (e.g. all MSs of a certain class or all MSs within a particular TPZ) identifying some or all of the resources in a TXOP that the AP is claiming as a block in anticipation of the group's resource requirements. This block may include all of the radio resources within a TXOP or it may include a subset of resources from multiple sub-bands to provide the serving AP (e.g., AP '2' 1114) with options for responding to frequency-selective fading. The RCRs sent by individual MSs at step 1332 provide the AP with information on which radio resources within the block are most suitable for use by the MS (e.g., MS 'd' 1256). In step 1334, the AP (e.g., AP '2' 1114) schedules the use of resources within this block and assigns them to individual MSs within the group, providing the serving AP with greater flexibility in exploiting the diversity of channel and interference conditions experienced by MSs within the group when trading-off the demands of individual MS against the availability of resources. Then in step 1336, the serving AP (e.g., AP '2' 1114) sends the data to the MS (e.g., MS 'd' 1256) using the set of radio resources assigned in step 1334.

Figure 14:
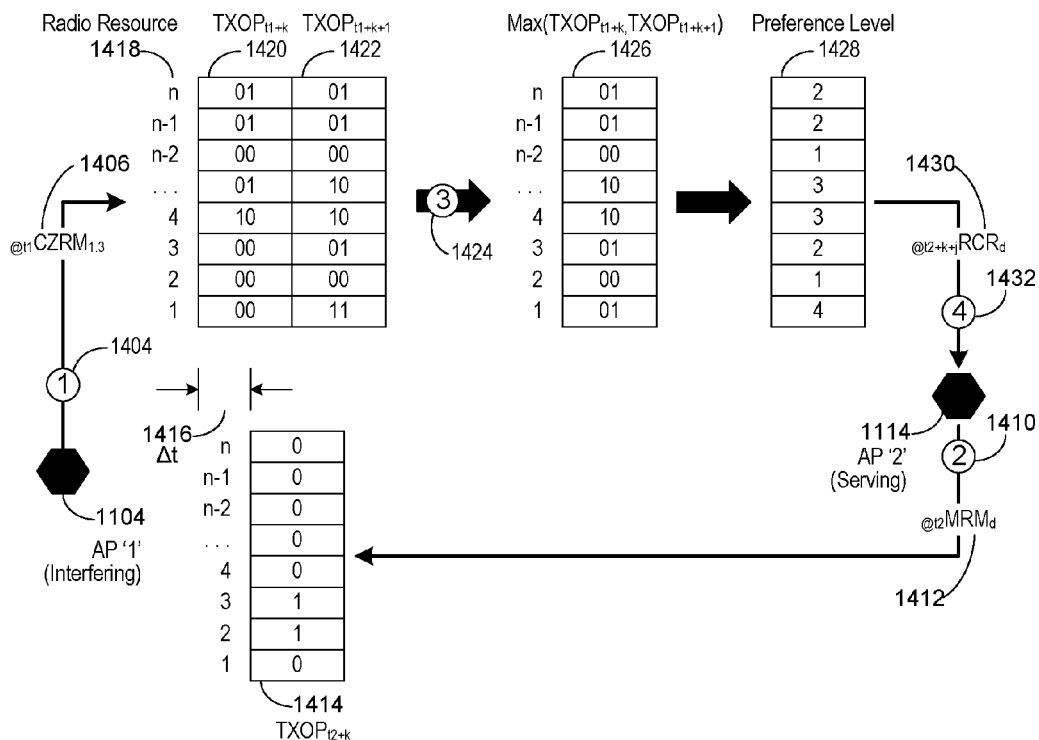
FIG. 14 is a simplified block diagram of a resource claims and contention resolution process.

FIG. 14 is a simplified block diagram of a resource claims and contention resolution process as implemented in an embodiment of the disclosure to mitigate interference between wireless access points. In this and various other embodiments, the CZRM broadcast by an AP for a transmit power zone indicates how each radio resource in the cell has been claimed by the AP relative to the TPZ referenced by the CZRM:

Resource claimed by this AP in a lower powered TPZ, with a CZRM value of '00';
Resource not claimed by this AP, with a CZRM value of '01';
Resource claimed by this AP in this TPZ, with a CZRM value of '10';
Resource claimed by this AP in a higher powered TPZ, with a CZRM value of '11'.

In this and various other embodiments, a mobile station (MS) includes the maximum value of the claims for each radio resource, across all overlapping transmission opportunities when it sends a resource contention report (RCR) to its serving AP. At the time of a designated transmission opportunity (TXOP), the serving access point (AP) may attempt to minimize potential interference by selecting resources for assignment to the mobile station in the following order of preference:

Claimed in lower powered TPZ;
Not claimed;
Claimed in this TPZ;
Claimed in higher powered TPZ.

For example, MS 'd' 1256 in FIG. 12 is located in 'TPZ$_{22}$' 1120, where it is being served by cell 'β' 1116 of AP '2' 1114. However, it is experiencing interference from cell 'α' 1106 of AP '1' 1104 in 'TPZ$_{1,3}$' 1112. As shown in FIG. 14:

In step '1' 1404, at time $t_1$, the interfering AP '1' 1104 broadcasts a claimed zone resource map $_{@t1}$CZRM$_{1,3}$ 1406 for 'TPZ$_{1,3}$' 1112, indicating which radio resources 1418 it is planning to use within cell 'α' 1106 in two upcoming transmission opportunities starting at times $t_{1+k}$ (TXOP$_{t1+k}$ 1420) and $t_{1+k+1}$ (TXOP$_{t1+k+1}$ 1422).

In step '2' 1410, at time $t_2$, the serving AP '2' 1114 sends a mobile station resource map $_{@t2}$MRM$_d$ 1412 to MS 'd' 1256, indicating the set of resources to be assigned to MS 'd' 1256 in an upcoming transmission opportunity starting at time $t_{2+k}$ (TXOP$_{t2+k}$ 1414). It will be appreciated that the time references or frame sequence numbers used in CZRM 1406 and MRM 1412 are relative to AP '1' 1104 and AP '2' 1114 respectively and may not be synchronized between AP '1' 1104 and AP '2' 1114.

In step '3' 1424, the transmissions of AP '1' 1104 and AP '2' 1114 may not be frame aligned when received by MS 'd' 1256. Therefore, MS 'd' 1256 may notice a difference in time (Δt) 1416 between the start of a TXOP from AP '1' 1104 and the start of a corresponding TXOP from AP '2' 1114. As a result, it is possible that transmissions from AP '1' 1104 in two adjacent TXOPs 1420 and 1422 will interfere with a transmission 1414 from AP '2' 1114.

In step '4', at some time before the scheduled transmission opportunity at $t_{2+k}$ (e.g., at $t_{2+k-j}$), MS 'd' 1256 sends a resource contention report $t_{2+k-j}$ RCRd 1430 to AP '2' 1114 that reflects the claimed resources in all of the overlapping TXOPs from all of the interfering APs in the ICIZ of MS 'd' 1256.

In this and other embodiments, the contention report constructed by MS 'd' 1256 may include its preference 1428 for each radio resource 1418 where the preference level ranges from "most preferred" (value 1) to "least preferred" (value 4). The preference level 1428 may be based on the maximum value of the claims from AP '1' 1104 in TXOP$_{t1+k}$ 1420 and TXOP$_{t1+k+1}$ 1422 and on signal quality measurements made by MS 'd' 1256. More specifically, in this example, the report indicates that one of the radio resources 1418 'R$_2$' intended for use by MS 'd' 1256 has also been claimed by another AP in that TXOP, but in a lower-power TPZ, thus making it a preferred 1428 resource for use by MS 'd' 1256. Accordingly, the other radio resource 1418 'RR$_3$' intended for use by MS 'd' 1256 is currently not claimed in one of the overlapping TXOPs. However, it is still subject to use within the contending cell, thus making it a less preferred 1428 radio resource 1418 for use by MS 'd' 1256. When radio resources 1418 for TXOP$_{t2+k}$ 1414 are finally scheduled by AP '2' 1114, it may choose to continue to use radio resources 1418 'RR$_2$' and 'RR$_3$' on the assumption that there will be minimal interference from the neighboring cell. Conversely, it may attempt to use preferred 1428 radio resources 1418 'RR$_2$' and 'RR$_{n-2}$' of MS 'd' 1256 in an attempt to select the resources with the least interference.

Alternatively, AP '2' 1114 may defer transmissions and assign radio resources 1418 to MS 'd' 1256 in a different transmission time interval. The decision of whether to defer transmission may be based on the nature of the traffic scheduled for transmission to MS 'd' 1256 (e.g. how close is the queued information to its deadline) and may also be based on additional information provided by MS 'd' 1256 (e.g. that the resources claimed for a later TXOP indicate that additional resources are becoming available).

The serving AP '2' 1114 may also defer to the interfering AP '1' 1104 and avoid assignment of the resources identified in the RCR for some period of time after the target transmission opportunity TXOP$_{t2+k}$ 1414. After that deferral period has elapsed (e.g. at TXOP$_{t2+k+n}$), AP '2' 1114 can attempt to schedule use of the previously contended radio resources 1418 to determine if they are still in use by AP '1' 1104 in the ICIZ. The decision on whether or not to defer to another AP may be based on a priority that is assigned to each cell in an AP or that is derived from a known parameter (e.g. Physical Cell ID).

In one embodiment, "busy tones" (i.e., sub-carriers) of an Orthogonal Frequency-Division Multiplexing (OFDM) symbol are used to claim resources rather than a control message to announce the planned use of radio resources through a claimed zone resource map (CZRM). In this embodiment, the AP for each cell periodically broadcasts an OFDM symbol with at least one reference sub-carrier of an OFDM symbol (i.e. a tone) in each resource block that is being claimed in an upcoming TXOP. The OFDM symbol comprises the claimed zone resource symbol (CZRS) in which power is applied to the reference sub-carriers at the transmit power level for the corresponding transmit power zone. The reference sub-carriers may also be pre-coded or spatially multiplexed using the same parameters that will be used for data transmission during the upcoming transmission opportunity. The other tones in the resource block may be used for other purposes (e.g. for transmitting information to mobile stations).

If the MS finds that resources allocated in its MRM conflict with resources claimed in the CZRS from one or more of neighboring cells, the MS sends a RCR to its serving AP indicating which resources are in contention and providing an alternate set of resources that are not. The RCR may also be an OFDM symbol in which power is applied to each reference sub-carrier that is being claimed by at least one of the neighboring cells in the upcoming TXOP.

In an embodiment previously described in greater detail herein, the MS provides its serving AP with the set of radio resources claimed by a neighboring cell only when the MS detects a conflict with the resources assigned by its serving AP. In another embodiment, the MS acts as an over-the-air (OTA) relay for the types of control messages typically exchanged over the interface between APs in the backhaul network, an interface such as the 3GPP LTE X2 interface.

In this embodiment, each AP periodically transmits a CZRM indicating the radio resources that it plans to use in an upcoming TXOP. When a MS receives a CZRM from a neighboring cell, it forwards that information to its serving AP. The APs then adjust their CZRM based on claims from other cells. For example, radio resources could be pre-arranged into a set of resource groups. Likewise, each cell may be given preferred access to a resource group based, for example, on its physical cell ID such that the order of preference will be different for different resource groups, thereby ensuring that no cell can be starved for resources. Accordingly, if an AP determines that a neighboring cell has preferred access to a set of contended resources, it defers to the neighbor and releases its claim to the resources. Over time, the neighboring cells will converge on a partitioning of radio resources based on resource demands and on the relative preference levels of the cells.

In an embodiment previously described in greater detail herein, an AP broadcasts a set of power reference signals (PRS) for each of its associated cells and uses the received power reference signal strength (RPRSS) reported by a MS to determine its corresponding path loss and transmit power zone (TPZ). In another embodiment, the AP associated with each cell periodically broadcasts a different set of PRS for each TPZ such that the power level of the PRS defines the extent of the TPZ. For example, in FIG. 11, PRS$_{2,3}$ is transmitted at power level TP$_{2,3}$ and defines the extent of 'TPZ$_{2,3}$' 1122. Accordingly, lower transmit power levels are targeted at MSs that are closer to the AP and they may not be received by MSs further from the AP or in shadowed areas of the cell.

In this embodiment, each MS is responsible for using the PRS to determine the collection of TPZs in which it is currently operating. A MS identifies the time and frequency radio resources assigned to power reference signals using cell control information (e.g. LTE System Information Block) that is periodically broadcast throughout the cell by an AP. Coordination mechanisms between APs (e.g. based on the Physical Cell ID) are required to ensure that reference signals in neighboring cells use an orthogonal set of resources. The MS performs SNR measurements on the PRS from the cells in its serving set and deems itself to be covered by those TPZs where the SNR of the power reference signal is above an acceptable value. The MS (e.g., MS 'd' 1256 in FIG. 12) then provides feedback to each cell in its serving cell set (MSCS) to identify the TPZs covering it within each cell. In this and other embodiments, the feedback may include the received power level of the PRS, allowing the AP to dynamically adjust the number, and extend, of each of the TPZs.

In an embodiment previously described in greater detail herein, an AP broadcasts a set of PRS for each cell and uses the RPRSS reported by a MS to determine its corresponding path loss and TPZ. In this embodiment, the AP broadcasts a different set of PRS for each TPZ in each cell such that the power level of the PRS defines the extent of the TPZ. In another embodiment, an AP broadcasts one set of power reference signals for each cell and also broadcasts cell control information (e.g. in the LTE System Information Block) that defines the number of TPZs in the cell and the received power reference signal strengths (RPRSS) that define the boundaries of each TPZ. The MS then performs measurements on the PRS received from the cell to determine the RPRSS at its location. The MS then compares its measured RPRSS with the entries in the list broadcast in the cell control information and reports the identity of the TPZ (e.g. the index within the list) associated with the matching entry to the serving AP.

Figure 15:
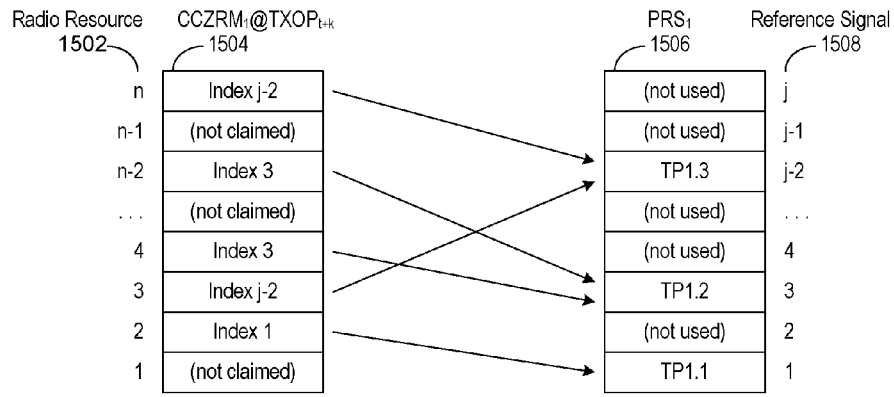
FIG. 15 is a simplified block diagram of a compact claimed resource map.

In an embodiment previously described in greater detail herein, an AP transmits a separate claimed zone resource map (CZRM) for each transmit power zone (TPZ) in a cell, which is broadcast at the transmit power level associated with that TPZ. FIG. 15 is a simplified block diagram of a compact claimed zone resource map (CCZRM) as implemented in an alternate embodiment of the disclosure to mitigate interference between wireless access points.

In this embodiment, a single compact claimed zone resource map (CCZRM) for each transmission opportunity, such as 'CCZRM$_1$@TXOP$_{t+k}$' 1504, is used within each cell, broadcast by the AP at the highest power level allowed for that cell, or alternatively, at some reduced power level determined by administrative policies or power management algorithms. Logically, the CCZRM contains an entry for each radio resource 1502 in the uplink direction, the downlink direction, or both, indicating the transmission power zone(s) where the radio resource 1502 will be used within the cell in the upcoming transmission opportunity.

In one embodiment, a single set of power reference signals (PRS), such as 'PRS$_1$' 1506, is used with transmission power zone(s) defined by received power reference signal strength (RPRSS) thresholds. In this embodiment, each entry of the CCZRM contains either an indication that the radio resource 1502 is unclaimed or, if it is claimed, the identifier for the transmission power zone (TPZ) where the radio resource 1502 will be used. In another embodiment, TPZ-specific PRS are used. In this embodiment, each entry of the CCZRM contains a reference 1508 to the PRS that defines the extent of the TPZ where the radio resource 1502 will be used. If the radio resource 1502 is not being claimed by this AP in the upcoming TXOP, there is no reference to a corresponding PRS.

For example, as shown in FIG. 15, radio resource 1502 'R$_4$' has been claimed by AP '1' 1104 for use in an upcoming transmission opportunity TXOP$_{t+k}$. This radio resource 1502 will be used within the TPZ defined by the power reference signal at 'index 3' within the 'PRS$_1$' 1506 set used by AP '1' 1104. Accordingly, the PRS at 'index 3' is transmitted at power level 'TP 1.2', thereby defining the extent of 'TPZ$_{1.2}$'. Likewise, radio resource 1502 'RR$_{n-2}$' has also been claimed for use in 'TPZ$_{1.2}$' ('index 3') while radio resources 1502'RR$_3$' and 'RR' been claimed for use in 'TPZ$_{1.3}$ index j-2') and radio resource 1502 'RR$_2$' has been claimed for use in 'TPZ$_{1.1}$' ('index 1').

In various embodiments previously described in greater detail herein, an AP is allowed to claim radio resources in the uplink direction, the downlink direction, or both. However, skilled practitioners of the art will be aware that the region covered by a mobile station's uplink transmission may be different from the region covered by an AP's downlink transmission, which could possibly affect the claiming of uplink resources and the reporting of those claims.

However, a mobile station (MS) may not be able to receive transmissions directly from another MS in order to detect uplink interference from other mobile stations. This is always the case when frequency division duplexing (FDD) is used on the radio link. Likewise, this is sometimes the case when time division duplexing (TDD) is used, such as when MSs are "hidden" from each other, either by topology or when searching for the signal from another, possibly unknown, MS is impractical.

Figure 16:
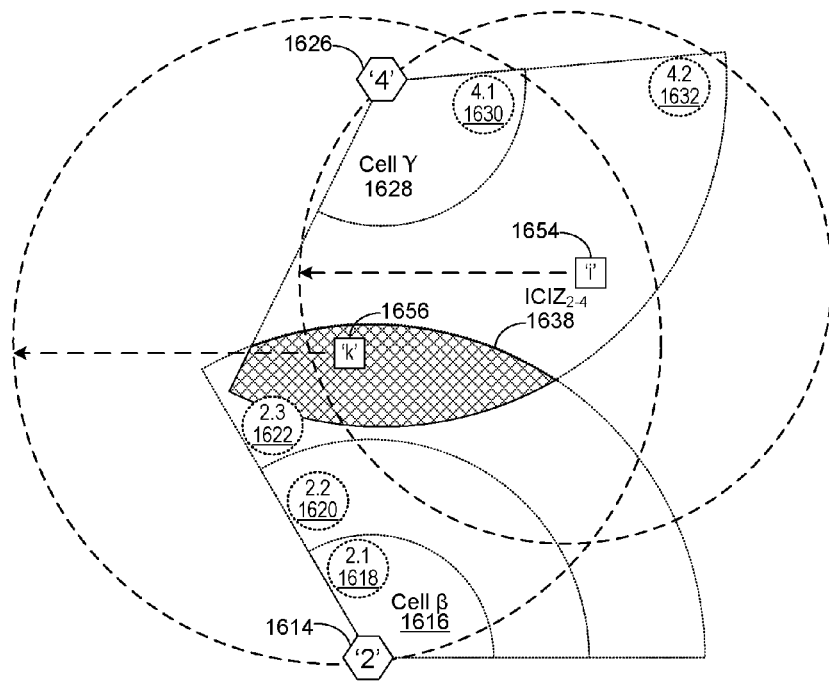
FIG. 16 is a simplified topological diagram showing the effect of an interfering mobile station transmitting on the uplink from inside of an inter-cell interference zone (ICIZ)

FIG. 16 is a simplified topological diagram showing the effect of an interfering mobile station inside of an inter-cell interference zone (ICIZ) in accordance with an embodiment of the disclosure for mitigating interference between wireless access points. In this embodiment, AP '2' 1614 comprises cell 'β' 1616, which in turn comprises transmit power zones 'TPZ$_{2.1}$' 1618, 'TPZ$_{2.2}$' 1620, and 'TPZ$_{2.3}$' 1622. Likewise, AP '4' 1626 comprises cell 'γ' 1628, which further comprises transmission power zones 'TPZ$_{4.1}$' 1630 and 'TPZ$_{4.2}$' 1632. As shown in FIG. 16, 'ICIZ$_{2-4}$' 1638 between AP '4' 1626 and AP '2' 1614 occurs mostly at the edges of the neighboring cells in portions of transmit power zone 'TPZ$_{4.2}$' 1632 in AP '4' 1126 and in portions of 'TPZ$_{2.3}$' 1622 in AP '2' 1614. As likewise shown in FIG. 16, MS 'k' 1656 is operating within 'ICIZ$_{2-4}$' 1638' while MS 'i' 1654 is operating within 'TPZ$_{4.2}$' 1632, which contributes to the 'ICIZ$_{2-4}$' 1638. However, MS 'i' 1654 is not operating within 'ICIZ$_{2-4}$' 1638 itself Since MS 'i' 1654 is outside of the 'ICIZ$_{2-4}$' 1638, and beyond the range of AP '2' 1614, it is unable to report AP '2' 1614 claims for 'TPZ$_{2.3}$' 1622 to AP '4' 1626. However, MS 'k' 1656 can report AP '4' 1626 claims for 'TPZ$_{4.2}$' 1632 to AP '2' 1614. As shown in FIG. 16, the region covered by the uplink transmission from MS 'i' 1654 only extends to its serving AP, AP '4' 1626. However, the region covered by the uplink transmission from MS 'k' 1656 extends to both its serving AP, AP '2' 1614 and to its neighboring AP, AP '4' 1626. Therefore, uplink resources assigned by AP '4' 1626 to MS T 1654 should not be used by MS 'k' 1656 as uplink transmissions from MS 'k' 1656 would also be received as interference by AP '4' 1626. This issue is successfully resolved in various embodiments, described in greater detail herein, by MS 'k' 1656 sending a resource contention report to AP '2' 1614, its serving AP, thereby causing it to avoid use of the contended radio resources.

Figure 17:
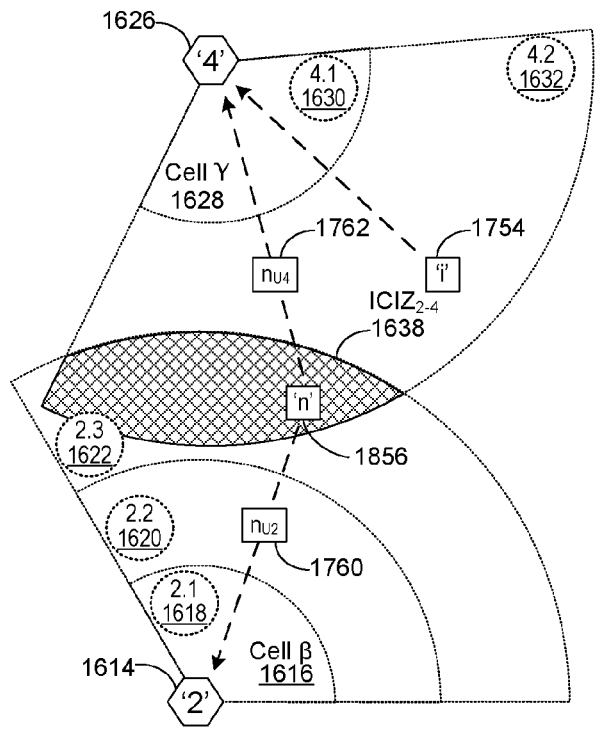
FIG. 17 is a is a simplified topological diagram showing the implementation of a mobile station to calculate path loss prior to transmitting on the uplink from inside of an ICIZ.

FIG. 17 is a is a simplified topological diagram showing a mobile station as implemented in accordance with an embodiment of the disclosure for calculating path loss to mitigate interference between wireless access points. In this embodiment, AP '2' 1614 comprises cell 'β' 1616, which in turn comprises transmit power zones 'TPZ$_{21}$' 1618, 'TPZ$_{22}$' 1620, and 'TPZ$_{23}$' 1622. Likewise, AP '4' 1626 comprises cell 'γ' 1628, which further comprises transmission power zones 'TPZ$_4$' 1630 and 'TPZ$_{4.2}$' 1632. As shown in FIG. 17, 'ICIZ$_{2-4}$' 1638 between AP '4' 1626 and AP '2' 1614 occurs mostly at the edges of the neighboring cells in portions of transmit power zone 'TPZ$_{4.2}$' 1632 in AP '4' 1126 and in portions of 'TPZ$_{2.3}$' 1622 in AP '2' 1614. As likewise shown in FIG. 17, mobile station (MS) 1756 is operating within 'ICIZ$_{2-4}$' 1638'and MS i' 1754 is operating within 'TPZ$_{4.2}$' 1632, which contributes to the 'ICIZ$_{2-4}$' 1638. However, MS i' 1754 is not operating within 'ICIZ$_{2-4}$' 1638 itself In an embodiment previously described in greater detail herein, an AP broadcasts a set of power reference signals (PRS) for each cell and uses the received power reference signal strength (RPRSS) reported by a MS to determine its corresponding path loss and transmit power zone (TPZ). In this embodiment, the AP broadcasts the transmit power level associated with the PRS such that the MSs can directly calculate and report the downlink path loss. Assuming that the path loss is reciprocal, the MS may use this calculation to determine if its uplink transmission will interfere with receptions by a neighboring AP.

Referring now to FIG. 17, MS 1756 receives the PRS and the associated transmit power level, TP$_{4.2}$ 1638, from the neighboring AP, AP '4' 1626. Based on the RPRSS, MS 1756 can calculate the downlink path loss from AP '4' 1626, path-loss (n$_{U4}$), and estimate the uplink path loss to AP '4', path-loss (n$_{U4}$) 1762, where:

pathloss ($n_{U4}$)≈pathloss ($n_{D4}$)=(TP$_{4.2}$−RPRSS$_{nD4}$)

Likewise, AP '2' 1614 sends a mobile station resource map (MRM) to MS 1756, which is used either independently or jointly with AP '2' 1614 to determine the transmit power 'TP$_{nU2}$' 1760 to be used by MS 1756 for uplink transmissions to AP '2' 1614 during an upcoming transmission opportunity. In this embodiment, MS 1756 can estimate the strength of these uplink transmissions when they are received by AP '4' 162 where:

RSS$_{Un}$=TP$_{nU2}$−pathloss ($n_{U4}$)

If this estimated value is below some predefined threshold (i.e. RSS$_{Un}$<RSS$_{thresh}$), then any uplink resources claimed by AP '4' 1626 in TPZ$_{4.2}$ 1632 may be deemed acceptable in the resource contention report (RCR) sent by MS 'n' 1756 to AP '2' 1614, allowing AP '2' 1614 and AP '4' 1626 to schedule the concurrent use of those uplink radio resources.

Figure 18:
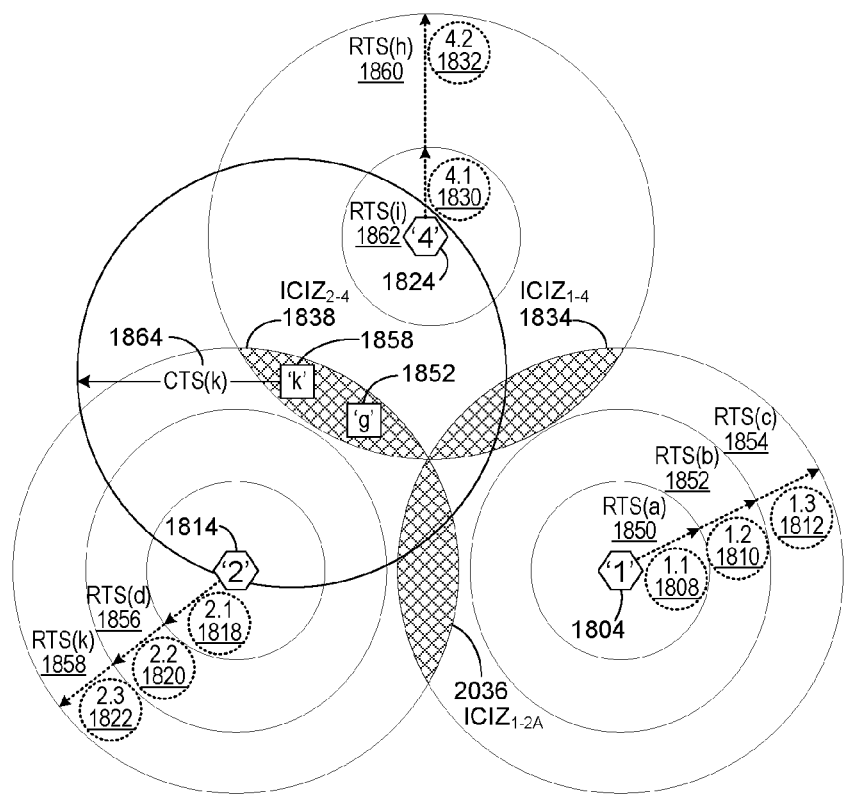
FIG. 18 is a is a simplified topological diagram showing a contention-based system as implemented for mitigating interference in a wireless local area network (WLAN).

FIG. 18 is a is a simplified topological diagram showing an embodiment of the disclosure for mitigating interference in a contention-based system such as that of an IEEE 802.11 wireless LAN. In this embodiment, a transmit power zone (TPZ) is defined by the extent of a Request-To-Send (RTS) transmitted by an Access Point (AP) at a certain transmit power level to a Mobile Station (MS). As shown in FIG. 20, AP '1' 1804 comprises '$TPZ_{1,1}$' 1808, '$TPZ_{1,2}$' 1810, and '$TPZ_{1,3}$' 1812, which respectively correspond to 'RTS(a)' 1850, 'RTS(b)' 1852, and 'RTS(c)' 1854. Likewise, AP '2' 1814 comprises '$TPZ_{2,1}$' 1818, '$TPZ_{2,2}$' 1820, and '$TPZ_{2,3}$' 1822, with '$TPZ_{2,2}$' 1820, and '$TPZ_{2,3}$' 1822 respectively corresponding to 'RTS(d)' 1856 and 'RTS(k)' 1858. As likewise shown in FIG. 18, AP '4' 1824 comprises '$TPZ_{4,1}$' 1830 and '$TPZ_{4,2}$' 1832, which respectively correspond to 'RTS(i)' 1862 and 'RTS(h)' 1860.

As shown in FIG. 18, the inter-cell interference zone (ICIZ) '$ICIZ_{1-2,4}$' 1836 between AP '1' 1804 and AP '2' 1814 occurs mostly at the edges of '$TPZ_{1,3}$' 1812 in AP '1' 1804 and of '$TPZ_{2,3}$' 1822 in AP '2' 1814. Likewise, '$ICIZ_{2-4}$' 1838 between AP '4' 1824 and AP '2' 1814 occurs mostly at the edges of '$TPZ_{4,2}$' 1832 in AP '4' 1824 and '$TPZ_{2,3}$' 1822 in AP '2' 1814. Likewise, the '$ICIZ_{1-4}$' 1834 between AP '4' 1834 and AP '1' 1804 likewise occurs mostly at the edges of '$TPZ_{4,2}$' 1832 in AP '4' 1824 and '$TPZ_{1,3}$' 1812 in AP '2' 1804.

In this embodiment, an inter-cell interference zone (ICIZ) is a region where overlapping Requests-to-Send (RTS) are received from different APs. For example, '$ICIZ_{2-4}$' 1838 is the result of an RTS transmitted from AP '2' 1814 to MS 'k' 1858 at the same time that an RTS is transmitted from AP '4' 1824 to MS 'g' 1852. Accordingly, the RTS acts as both a claimed zone resource map (CZRM) and as a mobile station resource map (MRM). The source address in the RTS frame identifies the AP claiming the resources and the destination address in the RTS frame identifies the MS being assigned the resources. For example, when the RTS transmitted from AP '2' 1814 is received by MS 'k' 1858 and MS 'g' 1852, this is an indication to both MSs that the radio resources have been claimed by AP '2' 1814 and assigned to MS 'k' 1858.

Likewise, the Clear-To-Send (CTS) transmitted by a MS acts as a resource contention report (RCR) both to the serving AP and to neighboring APs. It is equivalent to notifying the serving AP that the resource assignment is acceptable and to notifying the neighboring APs that they should not use these resources. For example, when the CTS(k) 1864 transmitted from MS 'k' 1864 is received by AP '2' 1814 and AP '4' 1824, it serves as an indication to AP '2' 1814, the serving AP, that the resource assignment was successful and serves as an indication to AP '4' 1824, the neighboring AP, that its claim in the RTS sent to MS 'g' 1852 was not successful and that it should refrain from using the radio resources for the period defined by the CTS.

From the foregoing, it will be apparent to skilled practitioners of the art that the use of mobile station-assisted interference mitigation procedures in a heterogeneous wireless network environment enables dynamic radio resource allocation across neighboring cells. Furthermore, such resource allocation accommodates both cell edge and overlay interference scenarios and likewise provides management of radio resources in the time, frequency and spatial (i.e., transmit power) domains and may be extended to the coding dimension.

Moreover, the allocation of radio resources can be based on instantaneous demand rather than statistical averaging of traffic. Likewise, the determination of coverage and interference zones can be based on information and measurement of signals actually received from serving and neighboring cells, which reflect true conditions in the propagation environment. Furthermore, real-time coordination can be achieved between APs that may not be able to communicate directly (e.g. via a backhaul network). Likewise, direct communication is only required between a MS and its serving AP as the MS only needs to monitor broadcasts from interfering neighbor APs. Furthermore, the degree of interference allowed between cells can be dynamically adjusted by changing transmit power levels based on resource conflict and usage reports received from the same MSs that are the target of an upcoming transmission. Likewise, radio resource coordination is enabled with macro (e.g., eNB) cells in femtocell (e.g., HeNB) deployments.

Those of skill in the art will likewise recognize that prevalent approaches within the wireless industry do not currently use feedback from the MS as a mechanism for dynamically managing the use of radio resources across a network. More specifically, the current approaches listed below embody the following limitations:

Multi-channel spectrum planning. The available spectrum is sub-divided into a number of non-overlapping channels and each cell within an AP is configured with the identity of the channel that it is to use. Off-line planning is used to ensure that cells within a neighboring AP are assigned different channels so that they do not interfere with each other. Accordingly, lower system capacity results due to the static partitioning of the available spectrum. In addition, off-line planning can be manually intensive and require network monitoring.

Dynamic frequency allocation. As before, the available spectrum is sub-divided into a number of non-overlapping channels. However, each Access Point dynamically determines which channel(s) it should use based on an algorithm. While this solution eliminates some of the manual labor associated with multi-channel spectrum planning, it still results in lower system capacity due to the static partitioning of the available spectrum.

Fractional frequency reuse (FFR). The available spectrum is sub-divided into a number of non-overlapping sub-bands and each cell within an AP is configured with the identity of the sub-band that it is to use in the edge region of its cell. In central regions of the cell closer to the AP, it can attempt to use all of the radio resources within the available spectrum. Off-line planning is used to determine the transmit power level to be used by an AP that marks the boundary between an edge region and a central region. This approach results in lower system capacity due to the static partitioning of the available spectrum in the edge region of the cell. In addition, off-line planning can be manually intensive and require network monitoring.

Adaptive fractional frequency reuse (AFFR). An AP may be configured with one or more FFR profiles where each profile defines the sub-band to be used in the edge region and the transmit power level determining the boundary between an edge region and a central region. The AP adjusts its operation to migrate between profiles based on the level of interference reported by its MS or based on signaling received from neighboring APs via the backhaul network. The adjustments in sub-band allocation and transmit power levels happen infrequently and must be coordinated by signaling over the backhaul network to prevent "flapping" between profiles as the neighboring APs also attempt to adjust to different profiles.

In contrast, the embodiments of the disclosure previously described in greater detail herein provide the following capabilities:

Interference mitigation exploits multiple dimensions of the radio resource domain—time, frequency and space. Existing solutions only focus on the frequency dimension.

Mobile Stations act as a conduit for passing information between APs, allowing information to be exchanged in real-time between them, that in other circumstances, they would not be able to communicate. Existing approaches rely on the existence of a common backhaul network to allow communications between APs. Accordingly, cooperation between APs is not possible if this common network does not exist (e.g. if the APs are in different administrative domains or in different radio access networks).

The detection of inter-cell interference zones is based on reception of over-the-air (OTA) signals by a MS from neighboring cells which, by its very nature, reflects the actual—and dynamically changing—propagation environment in which each individual MS operates. Existing approaches rely on modeling techniques that are less accurate and do not cater to the conditions currently being experienced by an individual MS.

The dynamic detection of inter-cell interference zones accommodates deployment scenarios that involve overlapping coverage at the edges of a cell, underlay coverage provided by micro-, pico- and femto-cells, and irregular islands of coverage resulting from the vagaries of the RF propagation environment. Existing approaches only deal with overlapping coverage at the nominal (e.g., circular) edges of a cell.

The detection and avoidance of resource conflicts is dynamic and does not rely on off-line planning. Existing approaches are static and are based on off-line measurements and spectrum planning.

The detection of resource conflicts, and the selection of available resources, is based on the actual assignment of radio resources by APs that is updated in real-time with their anticipated usage. Existing approaches rely on statistical averaging of resource usage to statically partition resources amongst potentially contending APs.

Radio resources are dynamically claimed and allotted to APs based on their instantaneous traffic requirements; these assignments can then be adjusted based on real-time feedback of resource conflicts. Existing approaches statically partition radio resources amongst APs, based on their potential for experiencing resource contention.

Although the described exemplary embodiments disclosed herein are described with reference to mitigating interference between access points in a heterogeneous wireless network environment, the present disclosure is not necessarily limited to the example embodiments which illustrate inventive aspects of the present disclosure that are applicable to a wide variety of authentication algorithms. Thus, the particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:

1. A mobile station comprising:
    processing logic operable to mitigate interference between a first wireless access point (AP) of a plurality of access points (APs) and at least a second wireless AP of the plurality of APs;
    processing logic operable to determine a first set of radio resources claimed for assignment by the first AP;
    processing logic operable to determine a second set of radio resources claimed for assignment by the second AP, a first set of resources claimed for assignment by a wireless AP for use in a first transmit power zone (TPZ) corresponding to a first transmit power level (TPL), and a second set of resources claimed for assignment by the wireless AP for use in a second TPZ corresponding to a second TPL; and
    processing logic operable to communicate interference mitigation data associated with the first and second sets of radio resources to the first wireless AP such that interference is mitigated,
    wherein the mobile station is operable to respectively determine claims for the first and second set of resources when the mobile station is located within the first and second TPZs, and wherein the mobile station receives from the first wireless AP resource preference information prioritizing the first TPZ and the second TPZ based on the first and second TPLs, respectively, such that the mobile station mitigates interference between the first and second wireless APs by selecting one of the first set of resources claimed or the second set of resources claimed based on the prioritizing the first TPZ and the second TPZ.

2. The mobile station of claim 1, wherein the mobile station is operable to communicate interference mitigation data comprising the second set of radio resources to the first wireless AP.

3. The mobile station of claim 1, wherein:
    at least one of the radio resources from the first set of radio resources claimed by the first wireless AP is also included in the second set of radio resources claimed contemporaneously by the second wireless AP; and
    the mobile station is operable to communicate interference mitigation data comprising the second set of radio resources to the first wireless AP.

4. The mobile station of claim 1, wherein:
    at least one of the radio resources from the first set of radio resources claimed by the first wireless AP is also included in the second set of radio resources claimed contemporaneously by the second wireless AP; and
    the mobile station is operable to communicate interference mitigation data comprising radio resource assignment conflict data to the first wireless AP, the radio resource assignment conflict data comprising the set of conflicted resources included in both the first and second sets of radio resources.

5. The mobile station of claim 1, wherein the mobile station is operable to process the first and second sets of claimed radio resources to generate interference mitigation data comprising radio resource selection data, the radio resource selection data comprising a set of selected radio resources from the first set of radio resources and a preference value assigned by the mobile station to each resource in the set of selected radio resources.

6. The mobile station of claim 1, comprising:
processing logic operable to determine that the claim for the first set of resources is transmitted by the wireless AP at the first TPL;
processing logic operable to determine that the claim for the second set of resources is transmitted by the wireless AP at the second TPL; and
processing logic operable to determine that the mobile station is located within the first TPZ if the mobile station successfully decodes the claim for the first set of resources and is located within the second TPZ if the mobile station successfully decodes the claim for the second set of resources.

7. The mobile station of claim 1, comprising:
processing logic operable to determine that a first set of power reference signals (PRS) transmitted by the wireless AP at the first transmit power level (TPL) is associated with the first transmit power zone (TPZ);
processing logic operable to determine that a second set of PRS transmitted by the wireless AP at the second TPL is associated with the second TPZ; and
processing logic operable to determine that the mobile station is located within the first TPZ if the mobile station successfully decodes the first set of PRS and is located within the second TPZ if the mobile station successfully decodes the second set of PRS.

8. The mobile station of claim 1, comprising:
processing logic operable to determine that a first set of pathloss data is associated with the first transmit power zone (TPZ);
processing logic operable to determine that a second set of pathloss data is associated with the second TPZ;
processing logic operable to determine a transmit power level (TPL) associated with a set of power reference signals (PRS) transmitted by the wireless AP;
processing logic operable to successfully decode the set of PRS, measure a Signal to Interference-plus-Noise Ratio (SINR) of the received PRS, and calculate a pathloss of the PRS; and
processing logic operable to determine that the mobile station is located within the first TPZ if the calculated pathloss matches the first set of pathloss data and is located within the second TPZ if the calculated pathloss matches the second set of pathloss data.

9. A method for mitigating interference between wireless access points, comprising:
mitigating interference between a first wireless access point (AP) of a plurality of access points (APs) and at least a second wireless AP of the plurality of APs by using processing logic of a mobile station;
determining, by the mobile station, a first set of radio resources claimed for assignment by the first AP;
determining, by the mobile station, a second set of radio resources claimed for assignment by the second AP;
communicating, by the mobile station, interference mitigation data associated with the first and second sets of radio resources to the first wireless AP such that interference is mitigated;
determining a first set of resources claimed for assignment by a wireless AP for use in a first transmit power zone (TPZ) corresponding to a first transmit power level (TPL);
determining a second set of resources claimed for assignment by the wireless AP for use in a second TPZ corresponding to a second TPL;
respectively determining the claims for the first and second set of resources via the mobile station when the mobile station is located within the first and second TPZs;
prioritizing the first and second TPZs based on power levels of the first and second TPZs;
achieving the mitigating interference between the first and second wireless APs by selecting one of the first set of resources claimed or the second set of resources claimed based on the prioritizing.

10. The method of claim 9, wherein the mobile station communicates interference mitigation data comprising the second set of radio resources to the first wireless AP.

11. The method of claim 9, wherein:
at least one of the radio resources from the first set of radio resources claimed by the first wireless AP is also included in the second set of radio resources claimed contemporaneously by the second wireless AP; and
the mobile station communicates interference mitigation data comprising the second set of radio resources to the first wireless AP.

12. The method of claim 9, wherein:
at least one of the radio resources from the first set of radio resources claimed by the first wireless AP is also included in the second set of radio resources claimed contemporaneously by the second wireless AP; and
the mobile station communicates interference mitigation data comprising radio resource assignment conflict data to the first wireless AP, the radio resource assignment conflict data comprising a set of conflicted resources included in both the first and second sets of radio resources.

13. The method of claim 9, wherein:
the mobile station processes the first and second sets of claimed radio resources to generate interference mitigation data comprising radio resource selection data, the radio resource selection data comprising a set of selected radio resources from the first set of radio resources and a preference value assigned by the mobile station to each resource in the set of selected radio resources.

14. The method of claim 9, comprising:
determining that the claim for the first set of resources is transmitted by the wireless AP at the first TPL;
determining that the claim for the second set of resources is transmitted by the wireless AP at the second TPL; and
determining that the mobile station is located within the first TPZ if the mobile station successfully decodes the claim for the first set of resources and is located within the second TPZ if the mobile station successfully decodes the claim for the second set of resources.

15. The method of claim 9, comprising:
determining that a first set of power reference signals (PRS) transmitted by the wireless AP at the first transmit power level (TPL) is associated with the first transmit power zone (TPZ);
determining that a second set of PRS transmitted by the wireless AP at the second TPL is associated with the second TPZ; and
determining that the mobile station is located within the first TPZ if the mobile station successfully decodes the first set of PRS and is located within the second TPZ if the mobile station successfully decodes the second set of PRS.

16. The method of claim 9, comprising:
determining that a first set of pathloss data is associated with the first transmit power zone (TPZ);
determining that a second set of pathloss data is associated with the second TPZ;

determining the transmit power level (TPL) associated with a set of power reference signals (PRS) transmitted by the wireless AP;

successfully decoding the set of PRS, measuring a Signal to Interference-plus-Noise Ratio (SINR) of the received PRS, and calculating a pathloss of the PRS; and determining that the mobile station is located within the first TPZ if the calculated pathloss matches the first set of pathloss data and is located within the second TPZ if the calculated pathloss matches the second set of pathloss data.

* * * * *